US012761614B2

(12) United States Patent
Yamasaki

(10) Patent No.: US 12,761,614 B2
(45) Date of Patent: Oct. 13, 2026

(54) APPLYING SYSTEM CONTROLLING A TIMING BETWEEN DRYING AND APPLICATION PROCESSES OF APPLIED MATERIALS

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 511 days.

(21) Appl. No.: 18/201,287

(22) Filed: May 24, 2023

(65) Prior Publication Data

US 2023/0408992 A1 Dec. 21, 2023

(30) Foreign Application Priority Data

Jun. 20, 2022 (JP) ................................. 2022-098708

(51) Int. Cl.

| | |
|---|---|
| ***A45D 29/00*** | (2006.01) |
| ***A45D 29/18*** | (2006.01) |
| ***G05B 15/02*** | (2006.01) |

(52) U.S. Cl.
CPC ............. *G05B 15/02* (2013.01); *A45D 29/00* (2013.01); *A45D 29/18* (2013.01)

(58) Field of Classification Search
USPC .......................................................... 700/306
See application file for complete search history.

(56) References Cited

U.S. PATENT DOCUMENTS

| | | | | |
|---|---|---|---|---|
| 6,286,517 | B1 | 9/2001 | Weber et al. | |
| 10,506,861 | B1 * | 12/2019 | Ma | A45D 29/18 |
| 2004/0250440 | A1 * | 12/2004 | Delaney | A45D 29/00 34/90 |
| 2015/0138264 | A1 * | 5/2015 | Yamasaki | B41J 3/407 347/9 |
| 2015/0375525 | A1 * | 12/2015 | Yamasaki | B41J 3/407 347/16 |
| 2020/0205549 | A1 * | 7/2020 | Mor Yosef | A45D 34/045 |
| 2022/0035516 | A1 * | 2/2022 | Tokunaga | G06F 3/1292 |

FOREIGN PATENT DOCUMENTS

| | | | |
|---|---|---|---|
| CN | 207803725 U | * | 9/2018 |
| JP | 2003534083 A | | 11/2003 |
| JP | 2015186565 A | * | 10/2015 |
| JP | 2017056190 A | | 3/2017 |

OTHER PUBLICATIONS

Japanese Office Action (and an English language translation thereof) dated Dec. 12, 2023, issued in counterpart Japanese Application No. 2022-098708.

* cited by examiner

*Primary Examiner* — Emilio J Saavedra
(74) *Attorney, Agent, or Firm* — Holtz, Holtz & Volek PC

(57) ABSTRACT

An applying system includes the following. A drying apparatus dries a first applying material applied to a surface of a nail. An applying apparatus applies a second applying material on the surface of the nail with the first applying material dried by the drying apparatus in between.

19 Claims, 15 Drawing Sheets

FIG. 4

| NAIL DESIGN | BASECOAT FORMING STEP | | PRE-PRINT COATING FORMING STEP | | DESIGN FORMING STEP | TOPCOAT FORMING STEP | |
|---|---|---|---|---|---|---|---|
| | COATING AGENT TYPE | DRYING TIME | COATING AGENT TYPE | DRYING TIME | DRYING TIME | COATING AGENT TYPE | DRYING TIME |
| DESIGN A | WHITE TYPE NO. 01 | 5 MINUTES | NO. 10 | 4 MINUTES | 1 MINUTES | NO. 20 | 5 MINUTES |
| DESIGN B | ○○ | ○ MINUTES | △ | △ MINUTES | ▽ MINUTES | □ | □ MINUTES |
| DESIGN C | ○○ | ○ MINUTES | △ | △ MINUTES | ▽ MINUTES | □ | □ MINUTES |
| ⋮ | ⋮ | ⋮ | ⋮ | ⋮ | ⋮ | ⋮ | ⋮ |

APPLYING SYSTEM CONTROLLING A TIMING BETWEEN DRYING AND APPLICATION PROCESSES OF APPLIED MATERIALS

REFERENCE TO RELATED APPLICATIONS

This application is based upon and claims the benefit of priority under 35 USC 119 of Japanese Patent Application No. 2022-098708, filed on Jun. 20, 2022, the entire disclosure of which, including the description, claims, drawings, and abstract, is incorporated herein by reference in its entirety.

TECHNICAL FIELD

The present disclosure relates to an applying system, an applying support method, and a storage medium.

DESCRIPTION OF RELATED ART

JP 2003-534083 describes an applying apparatus (printing apparatus) for printing on human nails and other objects.

For example, in a situation in which nail polish is applied to a fingernail, a step to dry the nail is necessary after applying the nail polish. Even when printing is performed on the nail using the applying apparatus, it is necessary to dry the liquid such as ink after application. For example, drying devices (e.g., nail dryers) are used to dry the liquid.

When printing is performed on the nail, for example, before forming a design with an applying apparatus (printing apparatus) (applying liquid such as ink), it is preferable to apply a basecoat to the nail such as a white color base and to apply a pre-print coating to form an ink receptive layer so that ink can be easily fixed. Moreover, after the design is formed by applying ink, it is preferable to apply a topcoat which is a liquid to protect the surface so that the design printed on the nail has a brighter color and the design lasts longer.

SUMMARY OF THE INVENTION

According to an embodiment of the applying system of the present disclosure, an applying system including: a drying apparatus that dries a first applying material applied to a surface of a nail; and an applying apparatus that applies a second applying material on the surface of the nail with the first applying material dried by the drying apparatus in between.

According to an embodiment of an applying support method of the present disclosure, an applying support method that is performed by an applying system including an applying apparatus and a drying apparatus, the method including: drying with the drying apparatus a first applying material applied on a surface of a nail by the applying apparatus; and applying a second applying material with the applying apparatus on the surface of the nail with the first applying material dried by the drying apparatus in between.

According to an embodiment of a storage medium of the present disclosure, a non-transitory computer-readable storage medium having a program stored thereon for controlling a computer in an applying system provided with a drying apparatus and an applying apparatus, the program controlling the computer to perform, a display control process in which, after waiting until a timing or a planned timing that a first applying material applied on a surface of a nail by the applying apparatus completes drying by the drying apparatus, a guidance display displayed on a display is switched to the guidance display to guide a user to apply a second applying material on the surface of the nail by the applying apparatus.

BRIEF DESCRIPTION OF DRAWINGS

FIG. 4 is a diagram showing an example of a table associating drying time.

DETAILED DESCRIPTION

Embodiments regarding the applying system, the applying support method, and the storage medium according to the present disclosure are described below with reference to the drawings.

Various limitations that are technically preferable to implement the present disclosure are added to the embodiments described below. However, the scope of the present disclosure is not limited to the embodiments and the illustrated examples described below.

For example, according to the example described below, a situation in which an apparatus dedicated to printing on nails by applying ink on fingernails of hands is described as an example of an applying apparatus (printing apparatus). The target that the applying apparatus applies liquid according to the present disclosure is not limited to fingernails of hands, and toenails of feet are also examples of the target on which liquid is applied. Targets of application may also be material other than nails such as nail tips or surfaces of various accessories.

In the embodiments described below, a situation in which a nail treatment process in which a design is printed on the nail is completed by a plurality of steps (forming steps) is described.

Here, the "plurality of forming steps" consist of the following steps. In the basecoat forming step, a basecoat which is to be a base is formed by applying a liquid with a white color to the nail. In the pre-print coating forming step, an ink receptive layer that fixes the ink applied by the applying apparatus (printing apparatus) which is the apparatus dedicated to printing on nails is formed on a base layer. In the design forming step, a design is formed (applied) with color ink by a later described applying apparatus on the ink receptive layer. In the top coat forming step, a coating agent is applied on the formed design. Each forming step includes a liquid applying step and a drying step to dry the applied liquid with the later-described drying apparatus (nail dryer). The applying step of the "plurality of forming steps" included in the nail treatment process includes an applying operation in which the liquid is applied by hand and an applying operation which is performed automatically by the applying apparatus 1.

The "plurality of forming steps" is not limited to those illustrated here and other steps may be included. Further, the "plurality of forming steps" may include some of the steps shown here.

Details of each forming step are described below.

First Embodiment

A first embodiment of the applying system, the applying support method, and storage medium according to the present disclosure is described with reference to FIG. 1 to FIG. 12C.

Figure 1:
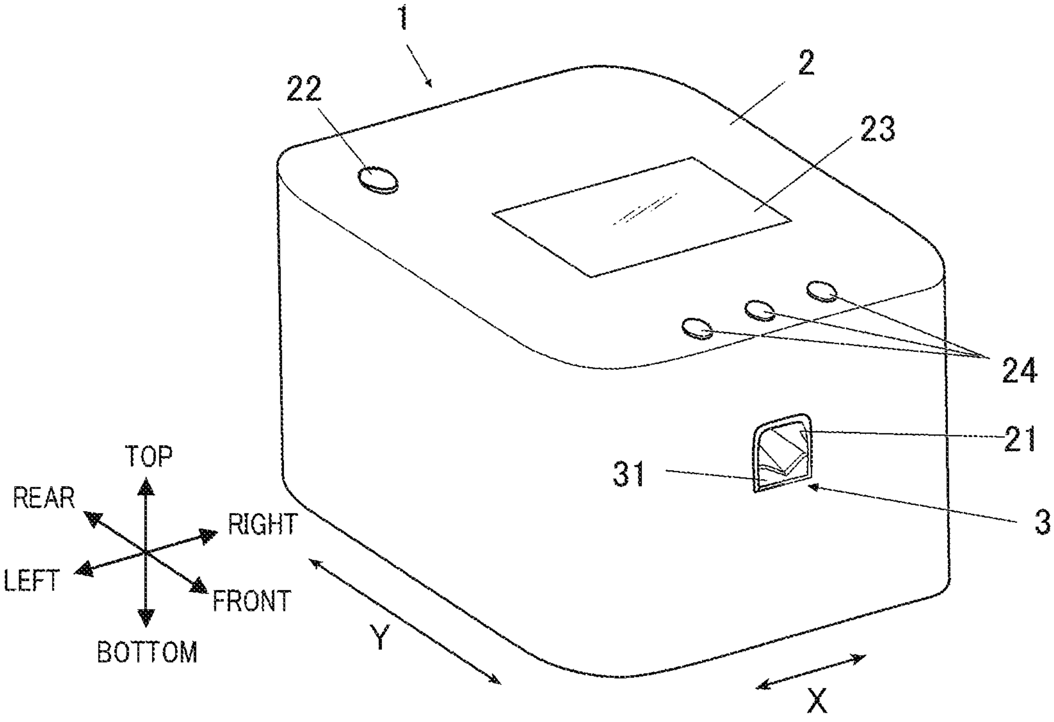
FIG. 1 is a perspective view showing an external appearance of a main section of an applying apparatus.
Figure 2:
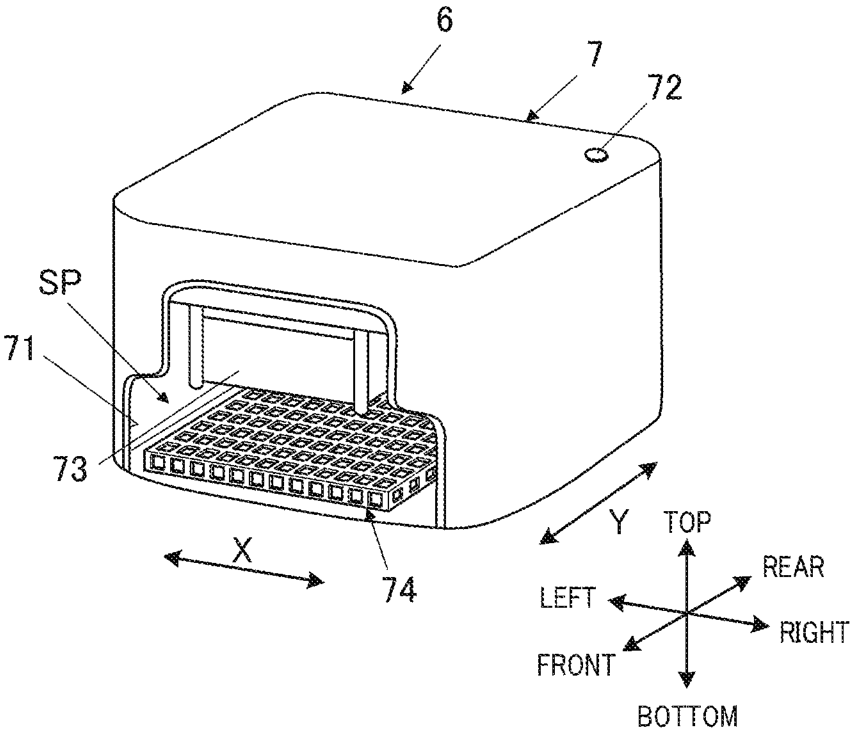
FIG. 2 is a perspective view showing an external appearance of a main section of a drying apparatus.
Figure 3:
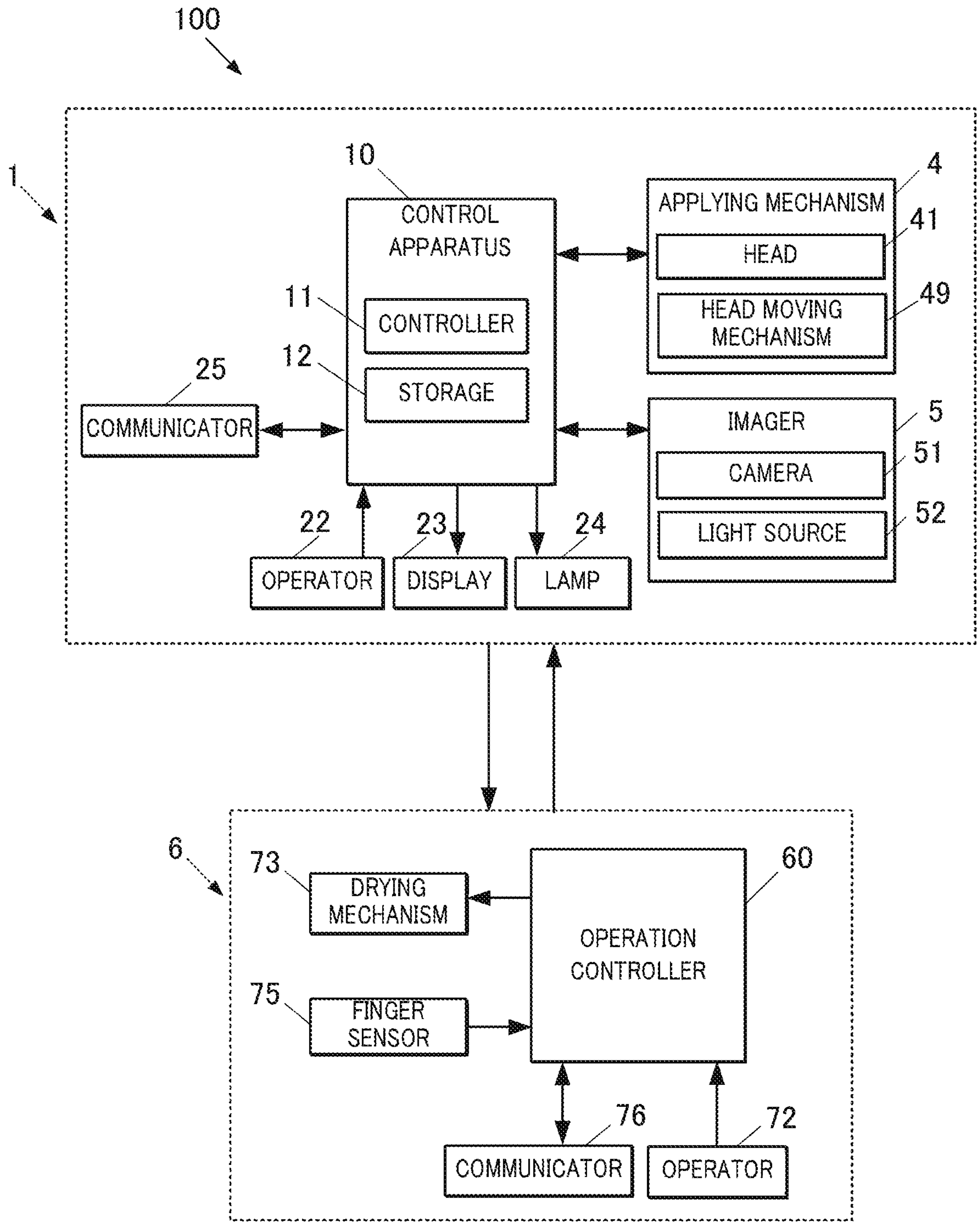
FIG. 3 is a block diagram of main sections showing an applying system and schematically showing a control configuration of the applying apparatus and the drying apparatus included in the applying system according to a first embodiment.

FIG. 1 is a schematic view showing an external configuration of a main portion of an applying apparatus 1 included in an applying system 100 according to the present embodiment. FIG. 2 is a schematic diagram showing the applying apparatus 1 shown in FIG. 1 and an external appearance of a main section of a drying apparatus 6 included in the applying system 100. FIG. 3 is a block diagram showing a control configuration of the main sections of the applying apparatus 1 and the drying apparatus 6 that operate in coordination with each other in the applying system 100 according to the present embodiment.

[Configuration of Applying Apparatus]

As shown in FIG. 1, the applying apparatus 1 according to the present embodiment includes a case 2 formed in a substantial box shape. In the description of the embodiments below, X-direction and Y-direction applied to the applying apparatus 1 are directions as shown in FIG. 1.

An opening 21 is formed on a front side of the case 2 (near side in the Y-direction in FIG. 1) of the applying apparatus 1 in substantially the center of a left-right direction (the X-direction in FIG. 1) of the apparatus. The opening 21 is the opening in which a finger corresponding to a nail (both not illustrated) that is to be a target of applying liquid (target) is inserted in the apparatus. The opening has a width and height so as to be large enough to enable the finger to be inserted and pulled out.

According to the present embodiment, a finger placer 3 in which a finger corresponding to the nail that is the target of applying liquid is placed is provided on the inner side of the opening 21 inside the case 2. Although not illustrated, preferably, the finger placer 3 includes a configuration to fix the placed finger so as to define the height direction of the finger.

The height, width, and length in the depth direction of the finger placer 3 are to be heights and widths so as to be able to position the finger stably, and the specific value is suitably set.

The opening 21 may be formed in a size (width and height) so as to be able to receive a plurality of fingers (for example, five fingers of one hand) at once. In this case, the size of the finger placer 3 provided on the inner side of the opening 21 is large enough to be able to place a plurality of fingers.

An operator 22 is provided on an upper surface (top panel) of the case 2.

The user performs various input on the operator 22.

For example, the operator 22 includes operation buttons to perform various input such as a power supply switch button to turn on and turn off the power of the applying apparatus 1, a stop switch button to stop operation, applying start button to instruct start of applying liquid, and the like.

The operation signal in response to the operation operated on the operator 22 is output to the controller 11 of the control apparatus 10. With this, the controller 11 controls the sections of the applying apparatus 1 and performs various operations according to the operation signal.

The display unit 23 is positioned on the upper surface of the case 2.

The display unit 23 is composed of any of a liquid crystal display (LCD), an organic electroluminescent display, and other displays (flat display). The display unit 23 displays various images and information on the display based on the display signal input from the later-described controller 11.

The display of the display unit 23 according to the present embodiment may be configured as one with a touch panel. In this case, the touch panel receives operation by touching by the user, and also functions as the operator 22 with which various input is performed.

A lamp 24 is positioned on the upper surface of the case 2 according to the present embodiment. The lamp 24 includes an LED, etc. for example. The controller 11 controls the lamp 24 and is able to suitably change the color and switch among continuously turning on the light, blinking, and the like.

For example, when the applying apparatus 1 becomes a state to allow applying operation, a green light is continuously lighted. When the applying operation starts and the applying operation is in progress, the green light blinks. A red light is continuously turned on while the applying operation is not allowed. When the applying operation cannot be performed, due to an abnormal situation in the apparatus, the red light blinks to indicate an error.

The lamp 24 functions as a notifying unit that notifies a situation in which applying of liquid to the nail that is the target according to the present embodiment is allowed by the controller 11 as a later-described process manager. The notifying unit is not limited to the lamp 24, and the display unit 23 may function as the notifying unit. The notifying unit does not have to make a notification visually by using the lamp 24 or the display unit 23, and may make a notification by sound, or the like, for example.

As shown in FIG. 3, the applying apparatus 1 includes the above-described operator 22, the display unit 23, and the lamp 24. The applying apparatus 1 also includes an applying mechanism 4, an imager 5, a communicator 25, and a control device 10.

The applying mechanism 4 includes a head 41, and a head moving mechanism 49 (see FIG. 3) that moves the head 41.

The head 41 is an applying unit that applies (prints) a liquid (ink that is the later-described second applying material according to the present embodiment) on a nail that is the target.

The head 41 according to the present embodiment is a print head with a cartridge integrated as one. The head 41 includes an ink retaining part (not shown) inside, and an ink-jet type ink-discharging mechanism (not shown). The ink discharging mechanism discharges fine droplets of ink stored in the ink retaining part and applies ink on the surface of the nail that is an applying target surface. The specific configuration of the head 41 is not limited and various types of the head 41 can be applied.

The head 41 provided in the applying mechanism 4 according to the present embodiment includes an ink retaining part corresponding to the ink with the colors cyan (C), magenta (M), and yellow (Y). The head 41 is a head for forming a design (nail design) with the color ink. The ink that can be applied by the head 41 is not limited to the ink noted above. The ink with the colors other than those noted above can be included in the head 41, and the ink can be discharged.

According to the present embodiment, the head 41 is able to move in a left-right direction (X-direction) and front-rear direction (Y-direction) of the apparatus. The head moving mechanism 49 includes an X-direction movement motor (not shown) that moves the head 41 in the X-direction and a Y-direction movement motor (not shown) that moves the head 41 in the Y-direction. The X-direction movement motor and the Y-direction movement motor are stepping motors, for example. The operation of the X-direction movement motor and the Y-direction movement motor is controlled by the controller 11 functioning as a later-described applying controller.

The imager 5 includes a camera 51 and a light source 52.

The camera 51 images the finger placer 3 and the surrounding area. With this, the target (nail) placed on the finger placer 3 is imaged and the image is obtained. The image obtained by the camera 51 is sent to the controller 11.

The light source 52 is an illuminating lamp such as a white color LED.

In a situation in which the nail is placed on the finger placer 3 as the target, the camera 51 of the imager 5 images the nail and the finger including the nail to obtain a nail image (not shown). According to the present embodiment, the later-described controller 11 detects from the nail image obtained by the camera 51 a nail outline that marks a nail region that is to be an applying region of the liquid.

The communicator 25 is a communicator that communicates with the external apparatus. The "external apparatus" according to the present embodiment is a later-described drying apparatus 6.

The communication between the applying apparatus 1 and the drying apparatus 6 is performed by the wireless LAN, etc., for example. The communication between the applying apparatus 1 and the drying apparatus 6 is not limited to the above, and any method can be used. For example, communication may be performed by using a network line such as the internet, or wireless communication can be performed based on short range wireless communication standards such as Bluetooth (registered trademark) or Wi-Fi. Such communication is not limited to a wireless connection method. A wired connection can be made between the applying apparatus and the drying apparatus, and various instruction signals and data can be transmitted and received between each other.

Together with the later-described controller 11, the communicator 25 according to the present embodiment functions as the start instruction transmitter. When a sensor of the drying apparatus 6 (later-described finger sensor 75) detects that the finger (fingernail) that is the target is placed, an instruction to start the drying operation by the drying mechanism 73 is transmitted to the drying apparatus 6. The start instruction may be an operation signal (ON switch that is hardware) that directly turns on the drying apparatus 6 (drying mechanism 73 of the drying apparatus 6), or may be an instruction signal that instructs operation to the drying apparatus 6 (drying mechanism 73 of the drying apparatus 6).

In a situation in which elapsed time counted by the controller 11 as the later-described time manager exceeds a "predetermined set time", the communicator 25 functions as a stop instruction transmitter that transmits a stop instruction to stop the drying operation by the drying mechanism 73 to the drying apparatus 6. The stop instruction may be an operation signal (OFF switch that is hardware) that directly turns off the drying apparatus 6 (drying mechanism 73 of the drying apparatus 6), or may be an instruction signal that instructs operation to the drying apparatus 6 (drying mechanism 73 of the drying apparatus 6). Alternatively, the drying apparatus 6 (drying mechanism 73 of the drying apparatus 6) may be an ON state while a drying signal output from the communicator 25 is HIGH, and the drying apparatus 6

(drying mechanism 73 of the drying apparatus 6) may be an OFF state while the drying signal from the communicator 25 becomes LOW.

The control apparatus 10 mounted on the applying apparatus 1 is a computer including a controller 11 including a processor such as a CPU (Central Processing Unit) (not shown) and a storage 12 including a ROM (Read Only Memory) and a RAM (Random Access Memory) (both not shown).

Various programs to operate the applying apparatus 1 and various data are stored in the ROM, etc. of the storage 12.

Various programs stored in the ROM, etc. are deployed and executed in a work region of the RAM by the controller 11. With this, the controller 11 centrally controls the operation of each unit of the applying apparatus 1.

That is, in coordination with the programs (for example, applying control process program that controls the applying operation by the applying mechanism 4), the controller 11 performs various functions for the applying apparatus 1 to perform the applying process.

The controller 11 according to the present embodiment mainly functions as a display controller that controls the operation of the display unit 23, an applying controller that controls the operation of each unit of the applying mechanism 4, an imaging controller that controls the operation of each unit of the imager 5, a communication controller that controls the operation of the communicator 17, and a time manager that manages the drying time by the drying apparatus 6.

The controller 11 as the display controller generates display data displayed on the display of the display unit 23, and outputs the display data to the display unit 23. For example, the controller 11 generates image data to display the nail image obtained by the imager 5, display data to display a design (nail design), etc. on the display unit 23, display data to display on the display of the display unit 23 various message screens, guidance display screens, error display screens, etc., and similar data.

The controller 11 as the applying controller controls the operation of the applying mechanism 4. Specifically, the controller 11 controls the head 41 according to the applying data and allows the head 41 to suitably eject ink. The controller 11 as the applying controller operates a head moving mechanism 48 (specifically, X-direction moving motor, Y-direction moving motor) and suitably moves the head 41 in the XY direction. The applying data may be generated by the controller 11 or may be obtained from outside. In a situation in which the controller 11 generates the applying data, for example, the nail region is recognized based on the image (nail image), etc. obtained by the imager 5 and the design is applied to the nail region. With this, the applying data is generated.

The controller 11 as the imaging controller controls the operation of the camera 51 of the imager 5 and the operation of the light source 52. According to the above, the light source 52 illuminates the nail and the surrounding area, and the camera 51 obtains the nail image, etc.

The controller 11 controls the operation of the communicator 25 as the communication controller. For example, in a situation in which the selection of the design (nail design), the detection of the nail outline from the nail image, and the generating of the applying data are performed in an external apparatus such as a terminal apparatus, etc. (not shown), the controller 11 controls the communicator 25 to receive from the external apparatus the data of the selected design, the detected nail outline, the generated applying data, etc.

The controller 11 of the above-described embodiment includes a timer function. After receiving the sensed result from the finger sensor 75 of the later-described drying apparatus 6 which is the sensor, the controller 11 functions as the time manager that counts the elapsed time from the predetermined point after sensing the finger.

For example, the "predetermined point" is, 2 or 3 seconds, etc. after the finger is sensed by the finger sensor 75. A later-described process manager determines on the basis of the elapsed time counted by the controller 11 as the time manager whether to guide to move forward to the next forming step. Therefore, preferably, the count is started at the point when it is sure that the drying operation by the drying apparatus 6 started.

That is, when it is sensed that the finger is placed in the drying apparatus 6, it is assumed that the user finished applying the liquid on the nail and the drying operation by the drying apparatus 6 is started. However, even if the finger is placed, the drying operation does not always start immediately in the drying apparatus 6. Therefore, it is possible to understand the elapsed time of the drying operation reliably by starting the count after some time elapses after the timing that the finger is sensed.

The controller 11 functions as the start instruction transmitter. The controller 11 controls the operation of the communicator 25 as described above in order to transmit the start instruction that starts the drying operation by the drying mechanism 73 to the drying apparatus 6 when the sensor (later-described finger sensor 75 of the drying apparatus 6) senses that the finger corresponding to the nail that is the target of drying is placed in the apparatus. The controller 11 also functions as the stop instruction transmitter. The controller 11 transmits the stop instruction to stop the drying operation by the drying mechanism 73 to the drying apparatus 6 when the elapsed time from a predetermined point after the finger is sensed by the finger sensor 75 of the drying apparatus 6 as the sensor exceeds a later-described "predetermined set time".

The controller 11 functions as a process manager that manages the process by guiding the process to the next forming step when the elapsed time counted by the timer function exceeds the "predetermined set time". According to the present embodiment, when the elapsed time counted by the timer function exceeds the "predetermined set time", the controller 11 as the process manager includes the function as the applying controller that allows the applying operation by the applying apparatus 1 and that allows the applying apparatus 1 to start the applying operation of the liquid (ink) which is the second applying material.

The guidance to proceed to the next forming step is performed by switching the guidance display displayed on the display unit 23 which is the predetermined unit to display to a guidance display to guide the applying of the ink (second applying material) by the applying apparatus 1. The "guidance" is not limited to a display and may be guidance by sound if the apparatus includes a speaker, for example.

Here, the "predetermined set time" is set according to the drying step of each forming step. Although the method of setting is not limited, for example, as shown in FIG. 4, the type of liquid (coating agent) and the look up table (LUT, hereinafter also referred to as "LUT with corresponding drying time") corresponding the necessary amount of time to dry the liquid is stored in the storage 12. The controller 11 refers to this table and understands the necessary "predetermined set time" to dry the liquid used in each forming step. Since the amount of time necessary for drying in each forming step is understood by the controller 11, even if the notification notifying that the drying is finished is not received from the drying apparatus 6, if the finger (nail) placed in the drying apparatus 6 is sensed, the controller 11 can derive the expected timing that the drying will be finished from the elapsed time counted from the point of sensing the finger. When the notification that the end of the drying is received from the drying apparatus 6, the guidance to advance to the next forming step may be performed based on this point of time (timing that the drying is finished) or the management of the process to allow the applying operation by the applying apparatus 1 may be performed.

As described above, according to the present embodiment, the printing on the nail (nail treatment process) is completed by the following four steps, a basecoat forming step, a pre-print coating forming step, a design forming step, and a topcoat forming step. The order in which the forming steps are performed and the liquid that is applied in each forming step is obtained by the controller 11 before the string of processes start as the contents of the nail treatment process.

That is, when the user selects the design (nail design) that the user desires to form (apply) on the nail, the contents of the design treatment process (specifically, the desirable forming step, the type of liquid, and the like) with which the selected design can be completed with the finest quality is determined. The present embodiment described below is an example describing, among the plurality of forming steps illustrated above, only the design forming step is performed by the applying apparatus 1, and the other forming steps (basecoat forming step, etc.) are performed by the user applying the liquid (coating agent) by hand.

For example, the components of the liquid (coating agent) used in the basecoat forming step are butyl acetate, nitrocellulose, alkyl acrylate copolymer, titanium dioxide, etc. For example, the components of the liquid (coating agent) used in the pre-print coating forming step are water, (VP/VA) copolymer, ammonium acrylate copolymer, etc. For example, the components of the liquid (coating agent) used in the topcoat forming step are butyl acetate, nitrocellulose, alkyl acrylate copolymer, etc.

As described above, the components included in the liquid used in each step are different. Therefore, there is a difference in the amount of time necessary to dry the liquid (for example, about 3 minutes to 5 minutes). The liquid (ink for design) applied by the applying apparatus 1 in the design forming step is normally a water-based ink, and it is assumed that the liquid is applied (printed) by the machine evenly. Therefore, the amount of time necessary for drying is short compared to the various other coating agents applied by hand by the user in the basecoat forming step, etc. (for example, one minute or less).

Even if the forming step is the same, a plurality of different types of liquids (coating agents) may be used depending on the design selected by the user. For example, in the basecoat forming step, in a situation in which a clear and vivid design is printed, the nail is to be painted as white as possible so that the natural nail color is completely erased. With this, the finish becomes more beautiful. Therefore, a white liquid with high coverage is selected as the liquid used in the basecoat. In a situation in which a design with a transparent finish is selected, a liquid which is somewhat pink or beige may be used as the coating agent of the base coat depending on the preferences of the user. The included components are different depending on the type of liquid, and there is a difference in the amount of time necessary to dry the liquid.

In a situation in which the contents of the nail treatment process (contents of the forming step included in the nail treatment process) are obtained together with the selection of the design selected by the user, the controller 11 as the process manager obtains the "predetermined set time" corresponding to the liquid (coating agent) used in each forming step by referring to the drying time corresponding LUT (see FIG. 4).

Figure 8A:
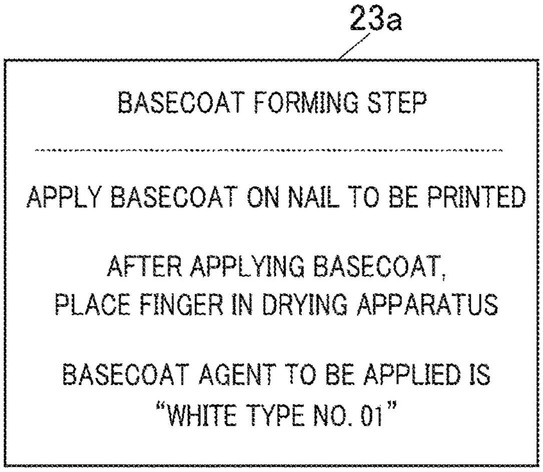
FIG. 8A is an example of a display screen displayed on a display unit in a basecoat forming step.
Figure 8D:
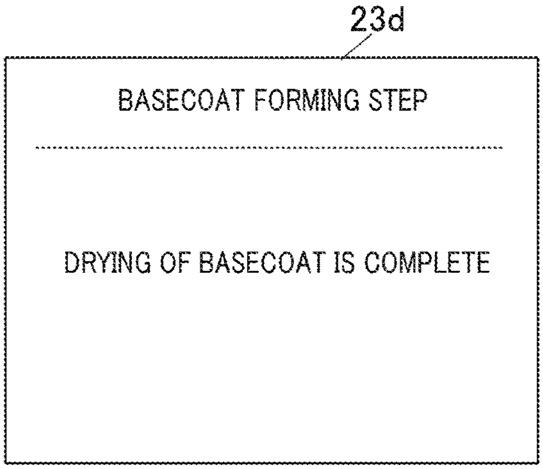
FIG. 8D is an example of the display screen displayed on the display unit in the basecoat forming step.
Figure 9A:
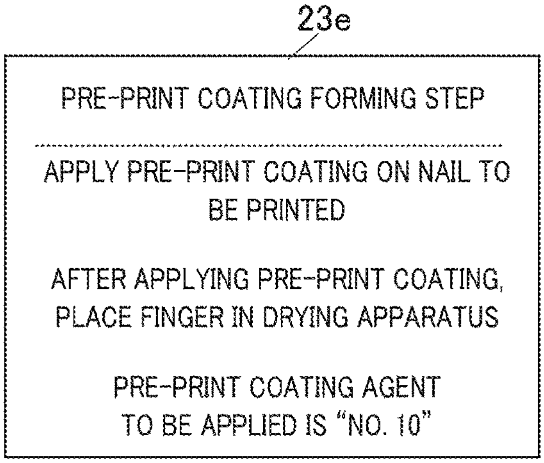
FIG. 9A is an example of the display screen displayed on the display unit in a pre-print coating forming step.
Figure 9B:
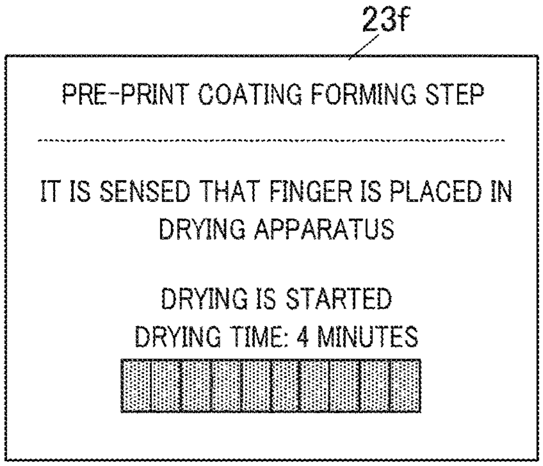
FIG. 9B is an example of the display screen displayed on the display unit in the pre-print coating forming step.
Figure 9C:
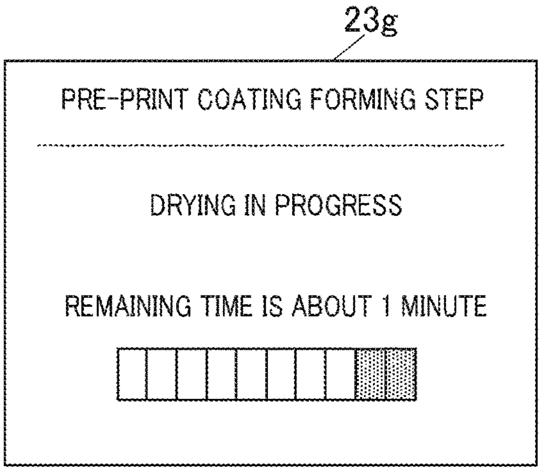
FIG. 9C is an example of the display screen displayed on the display unit in the pre-print coating forming step.
Figure 9D:
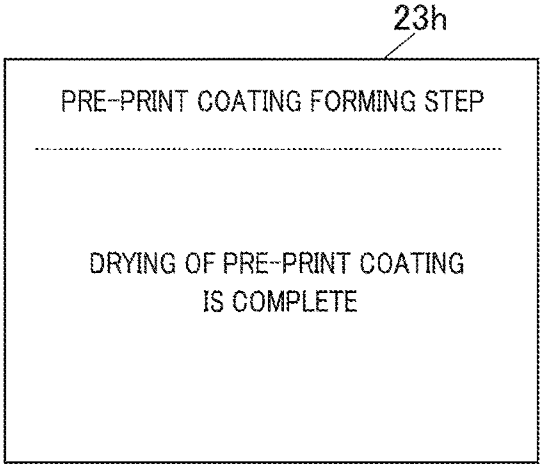
FIG. 9D is an example of the display screen displayed on the display unit in the pre-print coating forming step.

Then, in a situation in which the counted elapsed time exceeds the "predetermined set time", the controller 11 determines that the liquid (coating agent) is sufficiently dried and guides the user to advance to the next forming step. For example, according to the present embodiment, a guidance display (display screens 23*d*, 23*e*, etc.) as shown in FIG. 8D and FIG. 9A is displayed on the display unit 23. The specific method of the guidance is not limited. For example, in a situation in which the applying apparatus 1 includes a speaker, the next forming step can be guided by sound from the speaker.

According to the applying system 100 of the present embodiment, when the counted elapsed time exceeds the "predetermined set time", the user is guided to proceed to the next forming step. In other words, by not guiding the user to the next forming step until the elapsed time exceeds the "predetermined set time", it is possible to prevent the user from making the decision to proceed to the next forming step before the liquid is sufficiently dried, and it is possible to secure suitable drying time.

The present embodiment describes an example in which time management and process management are performed in all of the forming steps of the nail treatment process in order to secure the drying time. However, the embodiment is not limited to the situation in which the time management and the process management are performed in all forming steps. For example, among the forming steps in the nail treatment process, in a situation in which the forming steps including applying steps in which the liquid is applied by hand such as the basecoat forming step and the pre-print coating forming step continue, the time management and the process management do not have to be performed.

In a situation in which the liquid applied by hand (coating agent applied in the basecoat forming step and the pre-print coating forming step) is considered to be the "first applying material" and the liquid applied by the applying apparatus 1 (ink applied in the design forming step) is considered to be the "second applying material", if the "second applying material" is applied before sufficiently drying the "first applying material", the liquid dissolves in each other. As a result, the design is likely to be deformed and blurred. This greatly influences the finish of the design printed on the nail.

Therefore, if the process does not proceed to the next forming step until the elapsed time exceeds the "predetermined set time" especially when the process proceeds from the pre-print coating forming step in which the applying step is performed by hand to the next design forming step in which the applying step is performed by the applying apparatus 1, it is possible to achieve high quality printing on the nail.

[Configuration of Drying Apparatus]

As shown in FIG. 2, the drying apparatus 6 according to the present embodiment includes a case 7 formed in a substantial box shape. In the description of the embodiments below, X-direction and Y-direction applied to the drying apparatus 6 are directions as shown in FIG. 2. The shape of the drying apparatus 6 is not limited to the illustrated examples. As long as the drying apparatus 6 includes a drying mechanism such as the later-described fan or heater, the shape may be an air blower or a hair dryer, for example.

An opening 71 is formed throughout almost the entire width direction of the apparatus on the front side (near side in Y-direction in FIG. 2) of the case 7. The opening 71 is an inserting opening to insert a hand including a finger corresponding to the nail that is the target into the apparatus, and has a width and a height so as to be large enough to enable the hand to be inserted and pulled out. The size of the opening 71 is not limited to the illustrated example. For example, the width may be large enough to insert both hands at the same time. Alternatively, the opening may be a size (width) enough to insert one finger at a time. An operator 72 is provided on an upper surface (top panel) of the case 7.

The user performs various input on the operator 72.

For example, the operator 72 includes a power supply switch button to turn on and turn off the power of the drying apparatus 6, a stop switch button to stop operation, drying start button to instruct start of a drying operation, and operation buttons to perform various input.

The operation signal in response to the operation operated on the operator 72 is output to an operation controller 60. With this, the operation controller 60 controls the sections of the drying apparatus 6 according to the operation signal.

According to the present embodiment, the inside of the case 7 is a drying space SP to dry the nail on which the liquid (coating agent, etc.) is applied. A drying mechanism 73 is provided in an upper portion inside the drying space SP.

The drying mechanism 73 includes a motor (not shown), and is an axial flow fan including propellers (blades) that are driven to rotate by the motor.

The motor that operates the fan is controlled by the later-described operation controller 60. For example, when the value of the voltage applied to the motor (hereinafter referred to as "applying voltage value") becomes high, the number of rotations of the motor increases, and with this, the amount and speed of air flow from the fan becomes large.

The drying mechanism 73 is not limited to drying the liquid by the air flow from the fan. For example, instead of or together with the fan, a heater that heats the inside of the drying space SP can be provided. Depending on the type of liquid, heating can promote drying more effectively than blowing air. Therefore, the drying operation may be performed by choosing to use either the fan or the heater depending on the type of liquid.

A placing stage 74 is provided below the drying mechanism 73 inside the drying space SP. The placing stage 74 is where the finger including the nail as the target of drying is placed.

The placing stage 74 is formed of resin, for example. Preferably, a slit for the air flow is provided on the upper surface and the lateral surface of the placing stage 74 as shown in FIG. 2 so that the air flow from the drying mechanism 73 (*fan*) can efficiently escape. The shape and configuration of the placing stage 74 is not limited to the illustrated example.

A finger sensor 75 as a sensor that senses the finger placed on the placing stage 74 is provided on the upper surface of the placing stage 74.

The finger sensor 75 can be any means that senses that the finger including the nail that is the target of drying is placed in a predetermined position in the drying space SP (that is, state possible to start the drying operation), and the specific configuration is not limited. For example, as the finger sensor 75, a contact sensor, a pressure sensor, a button switch that generates a signal by pressing with the finger, and the like can be applied. Alternatively, it is possible to sense that the finger is placed by obtaining an image with a camera that is able to image the upper surface of the placing stage 74. For example, in a structure in which it is necessary to open a lid in order to place the finger in the case 7, a sensor or a switch reacts when the lid is opened, and it is possible to sense that the finger is inserted in the drying space SP.

As shown in FIG. 2 and FIG. 3, the drying apparatus 6 includes the operator 72, the drying mechanism 73, a communicator 76, and the operation controller 60.

The communicator 76 is a communicator that communicates with the external apparatus. The "external apparatus" according to the present embodiment is the applying apparatus 1, etc. The communicator 76 is configured to be able to communicate with a method corresponding to the communicator 25 of the applying apparatus 1 which is the device to communicate with. For example, wireless communication using wireless LAN, and short range wireless communication such as Bluetooth (registered trademark), Wi-Fi, etc., communication by wired connection, and communication by network lines such as the internet are possible.

If the finger sensor 75 senses that the finger is placed in the drying apparatus 6, a signal showing that the finger is sensed (finger sensing signal) is transmitted to the applying apparatus 1 through the communicator 76.

When an instruction to start the drying operation (start instruction) or to stop the drying operation (stop instruction) is transmitted from the controller 11 of the applying apparatus 1 through the communicator 25, the instruction is received by the communicator 76 and transmitted to the operation controller 60.

The operation controller 60 can centrally control each unit of the drying apparatus 6. For example, according to the start instruction or the stop instruction from the applying apparatus 1, the operation controller 60 starts or stops the drying operation of the drying mechanism 73.

After receiving the sensed result from the finger sensor 75, the result is suitably transmitted to the applying apparatus 1.

[Operation of Applying System and Applying Support Method]

Next, the operation of the applying system and the applying support method according to the present embodiment is described with reference to FIG. 5 to FIG. 12C.

Figure 5:
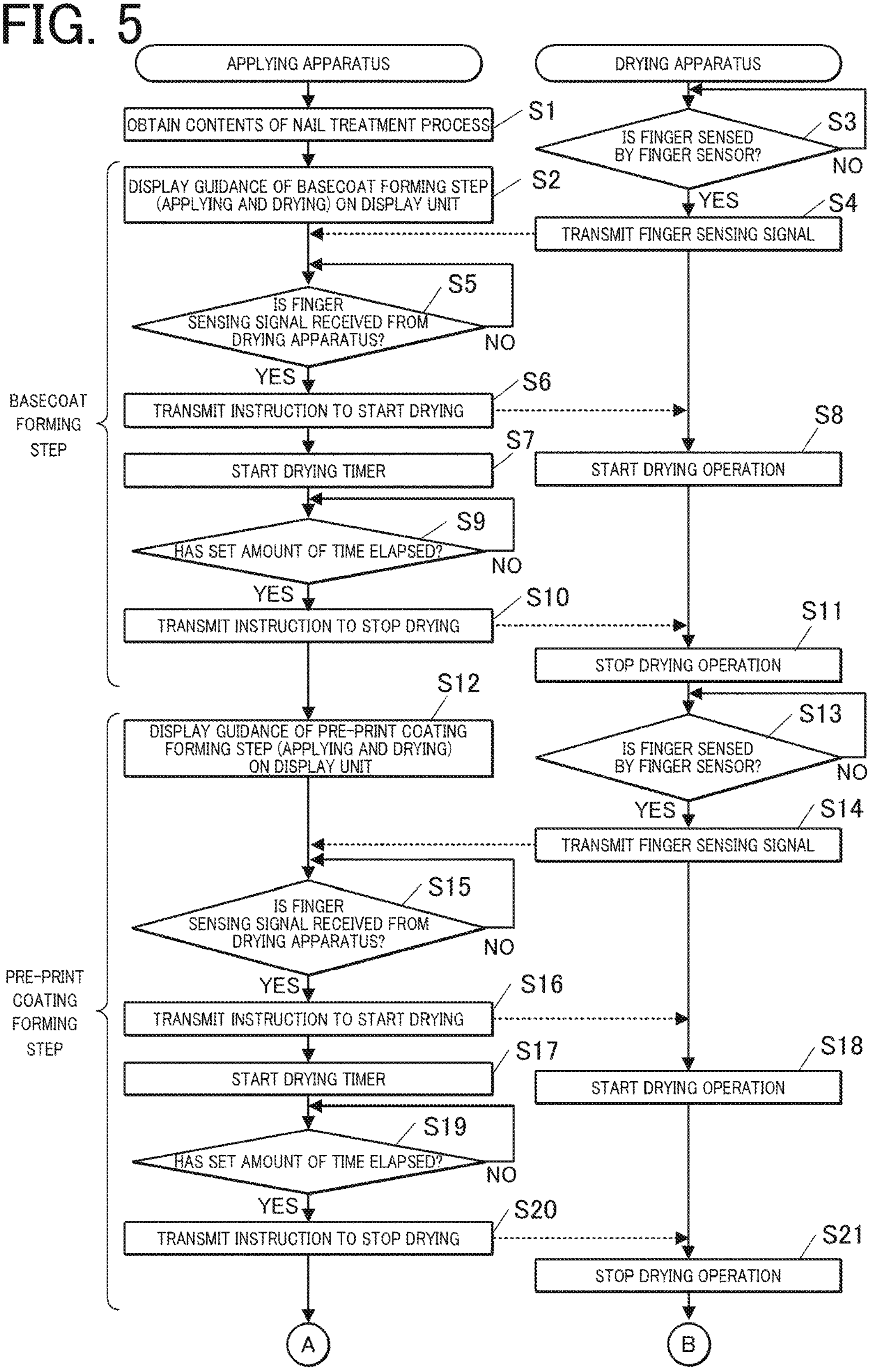
FIG. 5 is a flowchart showing a process between the applying apparatus and the drying apparatus according to the first embodiment.
Figure 6:
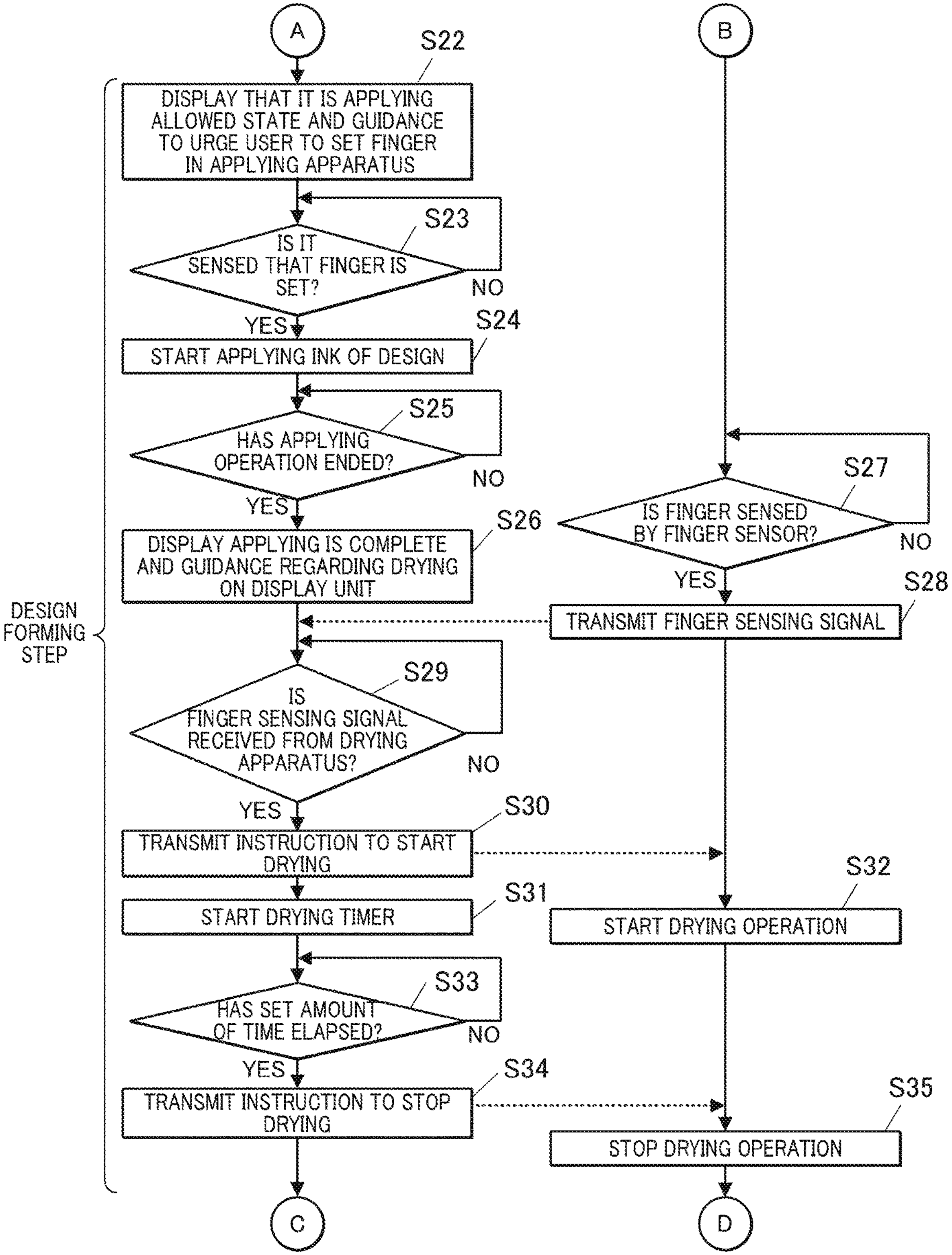
FIG. 6 is a flowchart showing the process between the applying apparatus and the drying apparatus according to the first embodiment.
Figure 7:
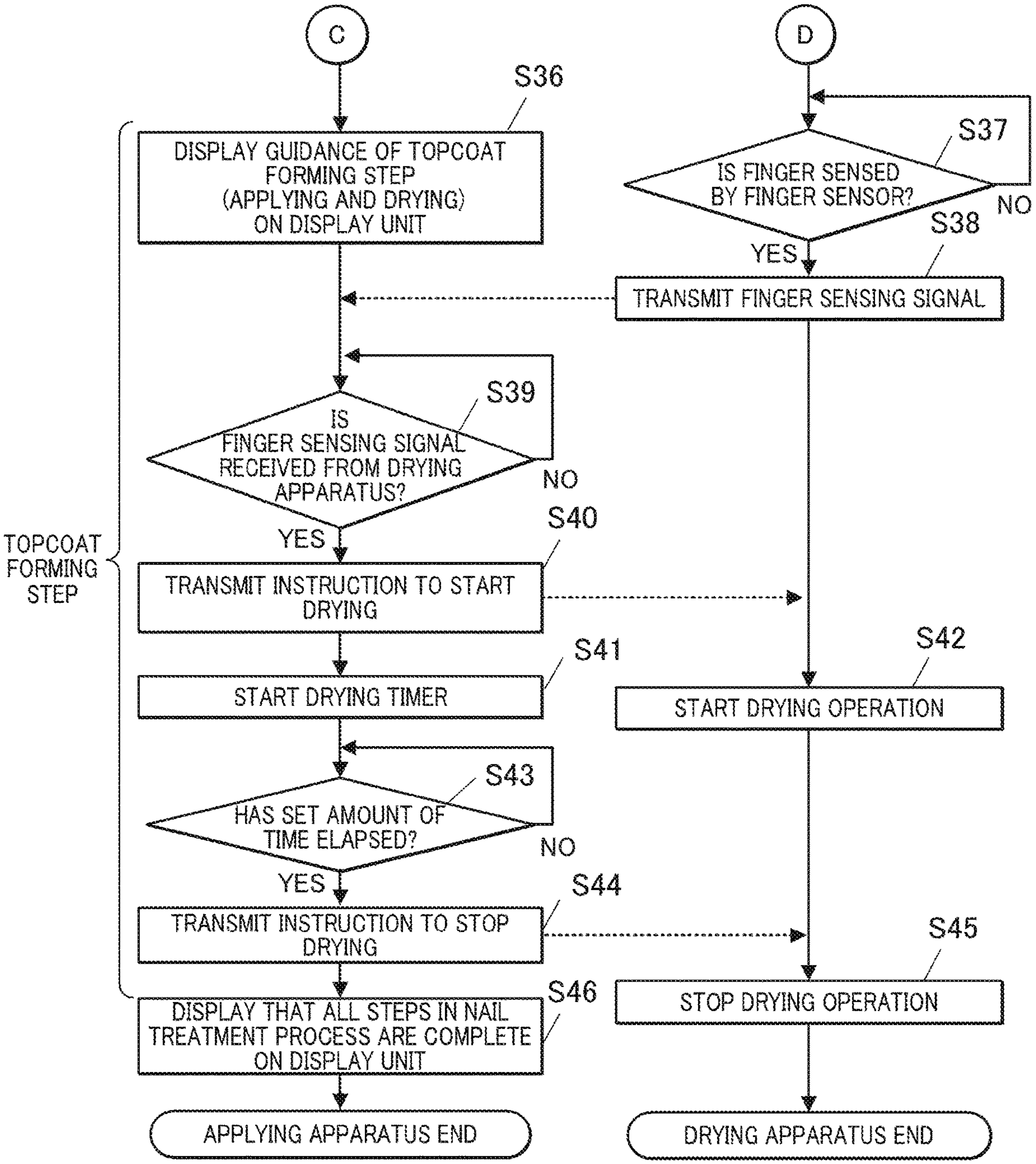
FIG. 7 is a flowchart showing a process between the applying apparatus and the drying apparatus according to the first embodiment.

FIG. 5 to FIG. 7 are flowcharts showing the applying control process of the applying system according to the present embodiment. Although illustration is omitted, in the applying control process of the applying system 100 according to the present embodiment, the applying apparatus 1 and the drying apparatus 6 can be linked so as to be able to communicate with each other. The process described below is based on the situation that the applying apparatus 1 linked to the drying apparatus 6 is already paired (registered and authenticated to each other).

For example, the applying apparatus 1 is able to inquire to the drying apparatus 6 whether it is possible to communicate with each other, and is able to be linked with the drying apparatus 6 that returns a response.

As shown in FIG. 5, according to the present embodiment, first the applying apparatus 1 obtains the contents of the nail treatment process for printing the nail (contents of the forming step included in the nail treatment process) (step S1). When the user selects the design that the user desires to form (apply) on the nail, the contents of the nail treatment process is determined by the controller 11 to include the necessary steps to form the selected design with high quality. The determined steps can be changed by the user according to the preferences of the user. The contents of the nail treatment process may also include the type of liquid used in each forming step (the coating agent which is the first applying material and the ink which is the second applying material). If there are a plurality of types of liquids (coating agents) that can be applied to each forming step, the options can be presented to the user and the user may choose from the options.

When the contents of the nail treatment process is obtained, the controller 11 displays on the display unit 23 a guidance that urges the user to apply and dry the basecoat (step S2). An example of the display screen 23*a* displayed on the display unit 23 displayed in this situation is shown in FIG. 8A. In a situation in which there are a plurality of agents (basecoat agent) that can be applied to the basecoat forming step, preferably, a guidance such as "the basecoat agent to be applied is oo" as shown in FIG. 8A is displayed on the display screen 23*a*. The specific layout is not limited to the illustrated example. A descriptive diagram in order to understand the entire nail treatment process (that is, entire flow of basecoat forming step→pre-print coating forming step→design forming step→topcoat forming step) may be displayed on the display unit 23. In this case, the present step being performed may be shown visually by changing the color of the step that is finished.

In the drying apparatus 6, the operation controller 60 monitors the sensed result from the finger sensor 75 and determines whether the finger sensor 75 sensed the finger placed in the drying apparatus 6 (step S3). The operation controller 60 repeats the monitoring of the sensed result until the finger sensor 75 senses that the finger is placed. When the finger sensor 75 senses the finger (step S3; YES), the operation controller 60 transmits the finger sensing signal showing that the finger is sensed to the applying apparatus 1 through the communicator 76 (step S4).

On the applying apparatus 1 side, the controller 11 determines whether the finger sensing signal is received from the drying apparatus 6 (step S5). When the finger sensing signal is received (step S5; YES), the controller 11 transmits the start signal to instruct the start of the drying operation to the drying apparatus 6 (step S6). The instruction to start the drying operation transmitted from the applying apparatus 1 side as described above may be a switch signal that directly turns ON the switch of the drying mechanism 73 of the drying apparatus 6 or may be a request to the operation controller 60 to turn ON the drying mechanism 73.

Figure 8B:
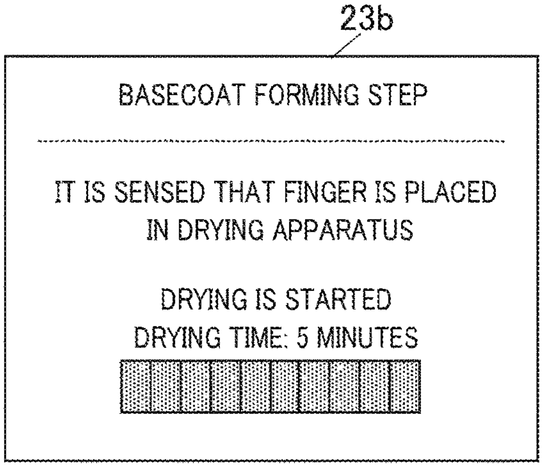
FIG. 8B is an example of the display screen displayed on the display unit in the basecoat forming step.

When the start instruction is transmitted, for example, preferably, the display screen 23*b* shown in FIG. 8B is displayed on the display unit 23. It is easy for the user to understand if a notification showing that the drying will start and the amount of time necessary for drying are displayed on the display screen 23*b*.

When the start instruction is transmitted, the controller 11 starts the timer (drying timer) to count the elapsed time of the drying operation as the time manager (step S7). Even if the finger sensor 75 that is the sensor senses the finger, there is some time delay until the sensed result is notified to the applying apparatus 1 and the start instruction is transmitted from the applying apparatus 1 to the drying apparatus 6. Even if the start instruction is transmitted, the drying mechanism 73 is not always turned on immediately. If the amount of time that the drying operation is actually performed is shorter than the elapsed time counted by the timer, there is a possibility that it is determined that the amount of time necessary for drying elapsed even if the amount of time is actually shorter than the necessary amount of time. Therefore, in order to prevent the amount of time that the drying is performed from being insufficient, preferably the timer that counts the elapsed time starts the counting from a "predetermined point" (for example, 2 or 3 seconds later) after the finger is sensed by the finger sensor 75 and the finger sensing signal is transmitted.

Figure 8C:
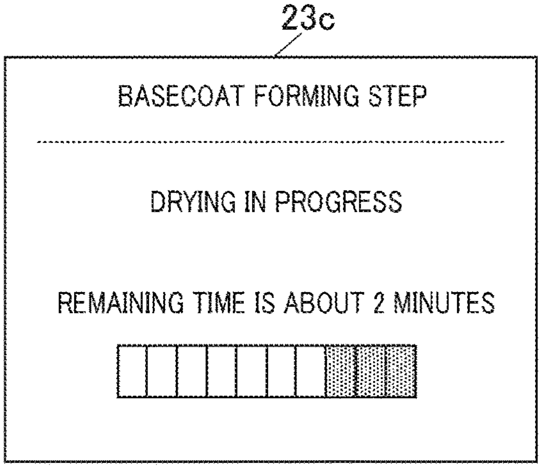
FIG. 8C is an example of the display screen displayed on the display unit in the basecoat forming step.

In a situation in which the remaining time is displayed on the display screen 23*b* and 23*c* as shown in FIG. 8B and FIG. 8C and the display of the remaining time changes with the count of the drying time, it is easy for the user to visibly understand how long the drying will continue. Therefore, such configuration is preferable.

In the drying apparatus 6, when the start instruction is received from the applying apparatus 1, the drying mechanism 73 is turned on and the drying operation is started (step S8).

The controller 11 of the applying apparatus 1 determines whether elapsed time counted by the timer exceeds the "predetermined set time" (step S9). When the elapsed time exceeds the "predetermined set time" (step S9; YES), the controller 11 transmits a stop instruction to the drying apparatus 6 to instruct the drying apparatus 6 to stop the drying operation by the drying mechanism 73 (step S10).

In the drying apparatus 6, when the stop instruction is received from the applying apparatus 1, the drying mechanism 73 is turned off and the drying operation is stopped (step S11). When the stop instruction is transmitted to the drying apparatus 6, preferably, for example, the controller 11 controls the display unit 23 to display the display screen 23*d* as shown in FIG. 8D and notifies to the user that the drying of the basecoat is finished.

According to the present embodiment, step S2 to step S11 shown in FIG. 5 are included in the "basecoat forming step".

As shown in FIG. 5, step S12 to step S21 show the flow of the "pre-print coating forming step". The specific contents are almost the same as step S2 to step S11 in the "basecoat forming step".

FIG. 9A to FIG. 9D show the display screens 23*e* to display screens 23*h* suitably displayed on the display unit 23 of the applying apparatus 1 in the "pre-print coating forming step". The displayed contents are almost the same as the display screen 23*a* to display screen 23*d* displayed on the display unit 23 in the "basecoat forming step".

When the processes up to step S21 are finished, the "basecoat forming step" (that is, applying and drying the basecoat agent) and the "pre-print coating forming step" (that is, applying and drying of the pre-print coating agent) are completed. The processes described above are steps in which the liquid is applied by hand before applying the liquid using the applying apparatus 1 (by the apparatus).

According to the present embodiment, the controller 11 as the process manager does not allow the applying of the liquid to the target (nail according to the present embodiment) by the applying apparatus 1 until the elapsed time counted for the steps before applying by the applying apparatus 1 exceeds the "predetermined set time" (that is, time necessary to dry the liquid (coating agent which is the first applying material). The controller 11 does not allow the applying apparatus 1 to progress to the design forming step until the drying time of the "pre-print coating forming step" exceeds the "predetermined set time".

Therefore, when the drying operation of the "pre-print coating forming step" stops, as shown in FIG. 6, the controller 11 of the applying apparatus 1 displays on the display unit 23 that the applying apparatus 1 is an applying acceptable state and a guidance to urge the user to set the finger in the applying apparatus 1 (step S22). A shutter may be provided in the opening 21 of the applying apparatus 1 and the shutter of the opening 21 may be closed until the applying apparatus 1 is in the applying acceptable state (that is, until the drying time of the "pre-print coating forming step" exceeds the amount of time necessary for drying) so that it is physically not possible for the user to insert the finger in the apparatus.

Figure 10A:
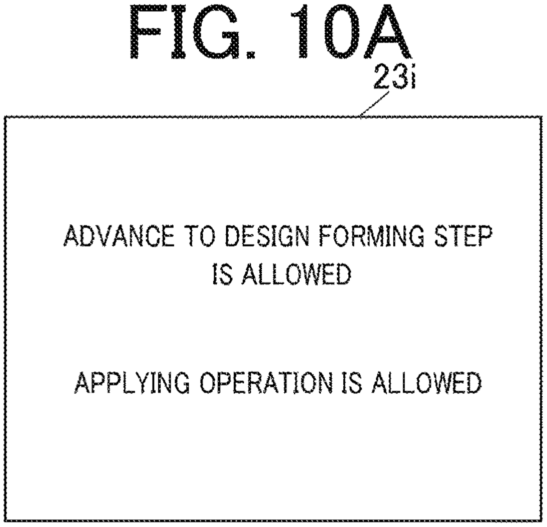
FIG. 10A is an example of the display screen notifying that the user is allowed to advance to a design forming step after the pre-print coating forming step.

FIG. 10A is an example of the display screen 23*i* notifying to the user that the user is allowed to advance to a design forming step. Alternatively, the lamp 24 may illuminate red until the applying apparatus 1 becomes an applying acceptable step. The color of the lamp 24 may change to a green color when the applying apparatus 1 becomes the applying acceptable step. In the above situation, when the applying to the nail as the target is allowed, the display unit 23 and the lamp 24 function as a notifying unit that notifies that the applying is allowed.

Figure 10B:
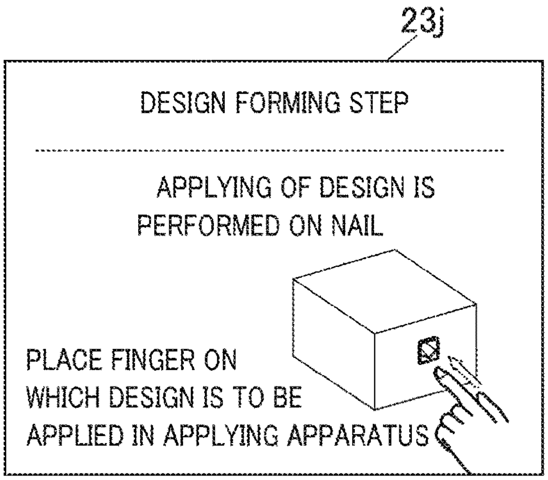
FIG. 10B shows an example of the display screen displayed on the display unit in a design forming step.

FIG. 10B is an example of the display screen 23*j* that notifies to the user to place the finger in the applying apparatus 1 in the design forming step.

As shown in FIG. 6, the controller 11 of the applying apparatus 1 senses whether the finger is set in the apparatus. The sensing method may be any method. For example, the camera 51 of the imager 5 may photograph the finger placer 3 and its surroundings and obtain an image. It may be confirmed whether or not the finger is placed by analyzing the image. Alternatively, a sensing sensor may be provided in the finger placer 3 and whether a sensing signal is output may be observed.

Figure 10C:
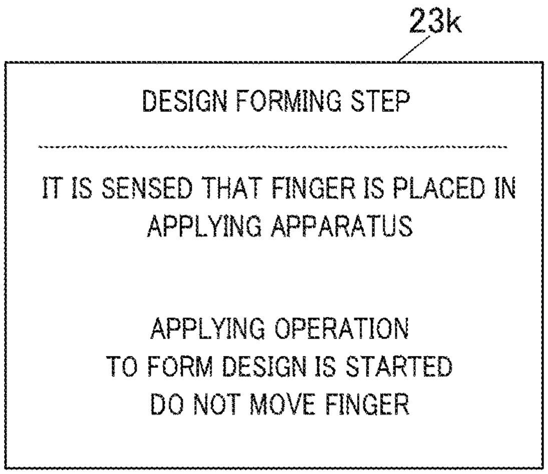
FIG. 10C shows an example of the display screen displayed on the display unit in the design forming step.

When it is sensed that the finger is set in the apparatus (step S23; YES), the controller 11 operates the applying mechanism 4 and forms the nail design on the nail (applying ink which is the second applying material) (step S24). Here, description of general contents of the applying operation such as the generating of the applying data is omitted. FIG. 10C is an example of the display screen 23*k* displayed on the display unit 23 in a situation in which it is sensed that the finger is set in the applying apparatus 1. In this situation, since a message showing that the applying operation will start and requesting to not move the finger during the applying operation is displayed as shown in FIG. 10C, it is possible to prevent the finger position from being misplaced or shifted even if the finger is not physically fixed with a jig. Since the finger may move after the finger is sensed, preferably, the applying operation is started 2 or 3 seconds after the finger is sensed.

The controller 11 determines whether the applying operation is finished (step S25) and when the applying operation is finished (step S25; YES), the controller 11 controls the display unit 23 to display that the applying operation is finished and displays the guidance regarding drying (step S26).

Figure 10D:
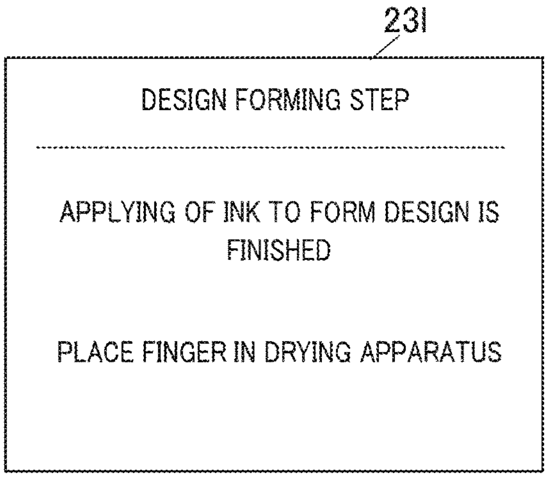
FIG. 10D shows an example of the display screen displayed on the display unit in the design forming step.

FIG. 10D is an example of a display screen 231 displayed on the display unit 23.

Similar to the "basecoat forming step" and the "pre-print coating forming step", in the drying apparatus 6 side, the operation controller 60 monitors the sensed result from the finger sensor 75, and determines whether the finger sensor 75 sensed the finger placed in the drying apparatus 6 (step S27). The operation controller 60 repeats the monitoring of the sensed result until the finger sensor 75 senses that the finger is placed. When the finger sensor 75 senses the finger (step S27; YES), the operation controller 60 transmits the finger sensing signal showing that the finger is sensed to the applying apparatus 1 through the communicator 76 (step S28).

The controller 11 of the applying apparatus 1 determines whether the finger sensing signal is received from the drying apparatus 6 (step S29). When the finger sensing signal is received (step S29; YES), the controller 11 transmits the start signal to instruct the start of the drying operation to the drying apparatus 6 (step S30).

Figure 11A:
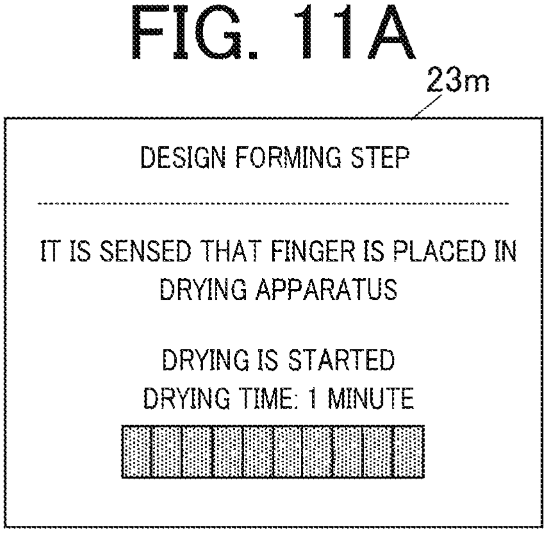
FIG. 11A shows an example of the display screen displayed on the display unit in the design forming step.

When the start instruction is transmitted, for example, preferably, the display screen 23*m* shown in FIG. 11A is displayed on the display unit 23. It is easy for the user to understand if a notification showing that the drying will start and the amount of time necessary for drying are displayed on the display screen 23*m*.

When the start instruction is transmitted, the controller 11 starts the timer to count the elapsed time of the drying operation (drying timer) as the time manager (step S31).

In the drying apparatus 6, when the start instruction is received from the applying apparatus 1, the drying mechanism 73 is turned on and the drying operation is started (step S32).

Figure 11B:
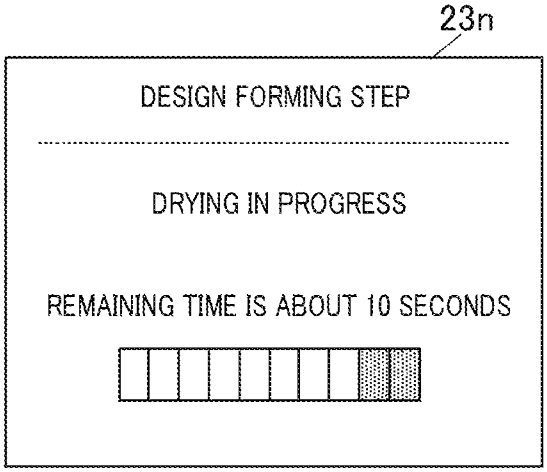
FIG. 11B shows an example of the display screen displayed on the display unit in the design forming step.

FIG. 11B is an example of a display screen 23*n* displayed on the display unit 23 during the drying operation. Preferably, as shown in the display screen 23*n*, the user can easily understand the remaining time if the user can visually confirm the remaining time of the drying operation reducing as the time passes.

The controller 11 of the applying apparatus 1 determines whether elapsed time counted by the timer exceeds the "predetermined set time" (step S33). When the elapsed time exceeds the "predetermined set time" (step S33; YES), the controller 11 transmits a stop instruction to the drying apparatus 6 to instruct the drying apparatus 6 to stop the drying operation by the drying mechanism 73 (step S34).

Figure 11C:
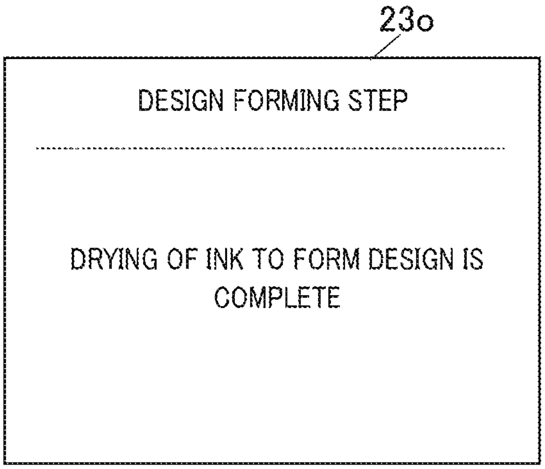
FIG. 11C shows an example of the display screen displayed on the display unit in the design forming step.

In the drying apparatus 6, when the stop instruction is received from the applying apparatus 1, the drying mechanism 73 is turned off and the drying operation is stopped (step S35). When the stop instruction is transmitted to the drying apparatus 6, preferably, for example, the controller 11 controls the display unit 23 to display the display screen 23*o* as shown in FIG. 11C and notifies to the user that the drying of the ink to form the design is finished.

According to the present embodiment, step S22 to step S35 shown in FIG. 6 are included in the "design forming step".

When the forming of the design and the drying of the applied liquid (ink for design) performed by the applying apparatus 1 are completed, the process advances to the next topcoat forming step.

As shown in FIG. 7, step S36 to step S45 show the flow of the "topcoat forming step". The specific contents are almost the same as step S2 to step S11 in the "basecoat forming step" and step S12 to step S21 in the "pre-print coating forming step".

Figure 12A:
FIG. 12A is an example of the display screen displayed on the display unit in a topcoat forming step.
Figure 12B:
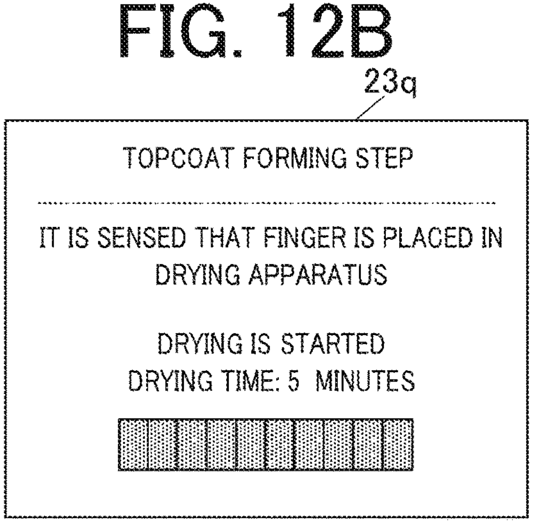
FIG. 12B is an example of the display screen displayed on the display unit in the topcoat forming step.

FIG. 12A and FIG. 12B show a display screen 23*p* and a display screen 23*q* suitably displayed on the display unit 23 of the applying apparatus 1 in the "topcoat forming step". The displayed contents are substantially the same as the display screen 23*a* and display screen 23*b* displayed on the display unit 23 in the "basecoat forming step" and the display screen 23*e* and the display screen 23*f* displayed on the display unit 23 in the "pre-print coating forming step".

As shown in FIG. 7, in a situation in which all of the planned forming steps included in the nail treatment process from the "basecoat forming step" to the "topcoat forming step" are finished, the controller 11 notifies the above by displaying a display on the display screen of the display unit 23 (step S46) and ends the process.

Figure 12C:
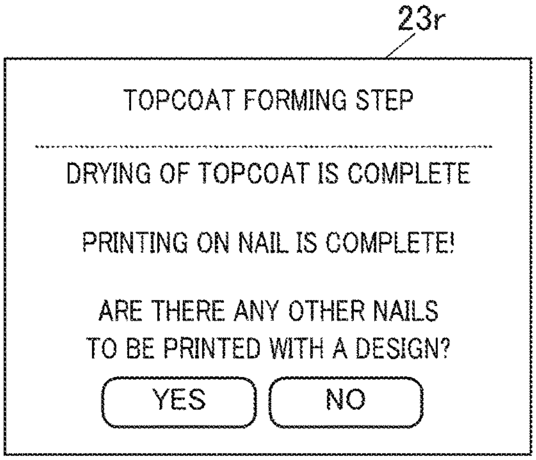
FIG. 12C is an example of the display screen displayed on the display unit in the topcoat forming step.

FIG. 12C is an example of a display screen 23*r* displayed on the display unit 23 when all of the steps in the nail treatment process ends. In this case, the display shows that the processes up to the topcoat forming step are finished. In a situation in which the treatment is performed on the nail one finger at a time as in the present embodiment, preferably a screen is displayed to confirm whether or not there are any other nails on which the user desires to form a design. In a situation in which there are other nails on which the user desires to form a design ("YES" is selected in FIG. 12C), the process returns to step S1 shown in FIG. 5 and the process is repeated for the nail.

According to the above embodiment, the user is not guided to the next step until after a sufficient amount of time passes to dry the liquid (coating agent that is the first applying material and ink that is the second applying material) applied in each forming step. Therefore, it is possible to prevent the user from running ahead of the process before the liquid is dried sufficiently.

When the same treatment is performed on nails in 5 fingers of one hand or 10 fingers of both hands, information such as the design selected by the user and the contents of the nail treatment process may be stored in the storage 12, and after step S46 shown in FIG. 7 is finished, the process from step S2 shown in FIG. 4 may be repeated from the treatment of the second finger.

As described above, according to the present embodiment, the applying system 100 includes the following. The drying apparatus 6 dries the first applying material (basecoat agent, pre-print coating agent) applied to the surface of the nail. The applying apparatus 1 applies the second applying material (ink for design applied by the applying apparatus 1) on the surface of the nail with the first applying material dried by the drying apparatus 6 in between. The controller 11 as the display controller displays a guide displayed on the display unit 23 which is the predetermined display means. The controller 11 switches to the guide display guiding the second applying material after waiting for the timing or the planned timing that the first applying material applied on the surface of the nail dries.

If the liquid of the next step (second applying material) is applied when the drying of the first applying material (coating agent and liquid such as ink) is insufficient, the applied liquid may be mixed, or the formed (applied) design may not be fixed properly. This may result in the design running or becoming deformed.

Therefore, in a situation in which there is a forming step of a plurality of layers, when the applying apparatus 1 performs the applying of the liquid (applying of the second applying material), it is important that the liquid applied in the step before is sufficiently dried (the applying of the liquid is performed on the layer that is sufficiently dried).

The applying operation of the second applying material (ink applied by the applying apparatus 1) by the applying apparatus 1 is guided after the first applying material (coating agent applied by hand by the user according to the present embodiment) is dried. Therefore, it is possible to prevent the user starting the applying operation by the applying apparatus 1 when the drying is still insufficient. With this, it is possible to prevent the second applying material applied by the applying apparatus 1 being mixed with the liquid (first applying material) applied before. Consequently, it is possible to prevent the deforming of the design formed by the applying apparatus 1 and the design can be printed on the nail with a high quality finish.

According to the present embodiment, the start of the applying operation of the second applying material is allowed after waiting for the timing or the planned timing that the drying of the first applying material applied to the surface of the nail is completed.

Since the applying operation by the applying apparatus 1 is not allowed until the timing that the drying ends (or is planned to end) after the first applying material is applied, the necessary drying time can be secured. Therefore, the design can be printed on the nail with a beautiful finish.

According to the present embodiment, after sensing that the nail in which the first applying material is applied on the surface is placed in the drying apparatus 6, the elapsed time of the drying operation started in the drying apparatus is counted based on the sensed timing. When the elapsed time exceeds the predetermined set time, the display of the display unit 23 is switched to the guide display that guides the applying of the second applying material.

By counting the elapsed time after the nail is set in the drying apparatus 6 and guiding the user to advance to the next step, it is possible to more reliably secure the drying time and to achieve a beautiful finish of the design printed on the nail.

According to the present embodiment, when the elapsed time of the drying operation exceeds the predetermined set time, the start of the applying operation of the second applying material is allowed.

Therefore, it is possible to reliably secure the time necessary for drying the first applying material and it is possible to achieve high quality finish of the design printed on the nail.

The means to notify to the user that the start of the applying operation of the second applying material is allowed is not limited to switching the display of the guide displayed on the display unit 23. For example, a notification by sound may be made. In this case, it is possible to notify to the user to advance to the next step if the user is within a range that the sound can be heard and the user does not have to standby in front of the display screen.

The amount of time necessary for drying in each step ("predetermined set time") such as the basecoat forming step is different depending on the type (included components) of applying material (liquid such as coating agent, ink, etc.). It is difficult for the user to know the necessary drying time for each applying material (liquid such as coating agent, ink, etc.) and to perform the drying operation for a suitable amount of time.

According to the present embodiment, the amount of time necessary for drying is set for each step (or liquid) (for example, table corresponding to drying time shown in FIG. 4) and the drying is managed by the controller 11 based on the above. Therefore, it is possible to suitably dry the liquid (coating agent and ink) in each step.

Second Embodiment

A second embodiment of the applying system, the applying support method, and storage medium according to the present disclosure is described with reference to FIG. 13 to FIG. 16C. The second embodiment is different from the first embodiment in that the drying apparatus 6 does not perform communication with the applying apparatus 1 side. The points different from the first embodiment are described below.

Figure 13:
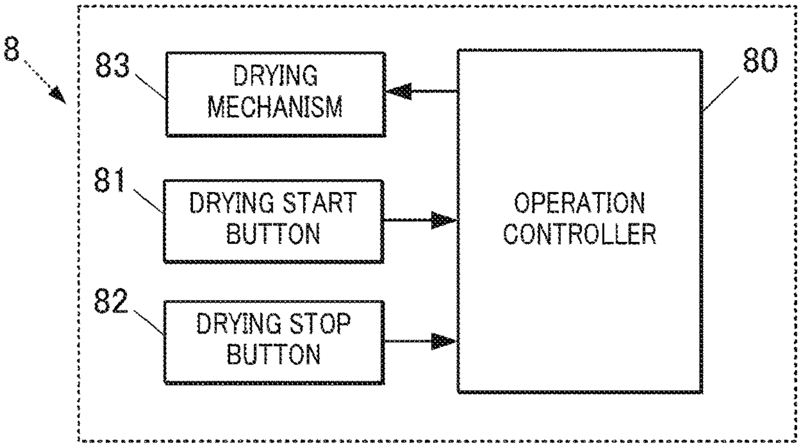
FIG. 13 is a block diagram of the main sections schematically showing a control configuration of the drying apparatus according to a second embodiment.

FIG. 13 is a block diagram showing a control configuration of a main portion of a drying apparatus included in an applying system according to the present embodiment.

As shown in FIG. 13, similar to the first embodiment, the drying apparatus 6 includes the drying mechanism 73 including a fan, a heater, or the like.

The drying apparatus 6 includes an operation controller 60 that centrally controls the entire apparatus.

The drying apparatus 6 according to the present embodiment does not include a communicator to communicate with external apparatuses such as the applying apparatus 1. Since it is not possible to notify to the applying apparatus 1 whether or not the finger corresponding to the nail that is the target of drying is positioned in the drying apparatus 6, the finger sensor to sense the finger is not provided.

Since the drying apparatus 6 does not communicate with external apparatuses such as the applying apparatus 1, it is not possible to receive the instruction signal from the applying apparatus 1 regarding the switching between on and off of the drying mechanism 73 (that is, signals of the start instruction and the stop instruction).

Therefore, the controller 11 of the applying apparatus 1 side functions as the obtaining means to obtain the information showing that the target (nail and finger corresponding to the nail) is placed in the drying apparatus 6 according to input operation by the user.

When the controller 11 obtains the information showing that the finger (nail) is placed in the drying apparatus 6, the controller 11 functions as the start instruction presenter and presents start instruction information urging the start of the drying operation by the drying apparatus 6. Specifically, the controller 11 displays on the display unit 23 messages requesting that the drying operation be started.

Similar to the first embodiment, the controller 11 counts the elapsed time from the start of drying. When the elapsed time exceeds the "predetermined set time", the controller 11 functions as the stop instruction presenter and presents stop instruction information urging the stop of the drying operation by the drying apparatus 6.

The drying apparatus 6 includes a button, etc. operated by the user to switch on and off of the drying mechanism 73 on an upper surface of the case, for example (not shown).

When the user operates the drying start button 81 according to the start instruction information displayed on the display unit 23 of the drying apparatus 1, the operation signal is transmitted to the operation controller 60, the drying mechanism 73 is turned on, and the drying operation starts. When the user operates the drying stop button 82 according to the stop instruction information, the operation signal is sent to the operation control signal 60, the drying mechanism 73 is turned off and the drying operation is stopped.

The other structures on the applying apparatus 1 side is similar to the first embodiment, and the description is omitted.

[Operation of Applying System and Applying Support Method]

Next, the operation of the applying system and the applying support method according to the present embodiment is described with reference to FIG. 14 to FIG. 16C.

Figure 14:
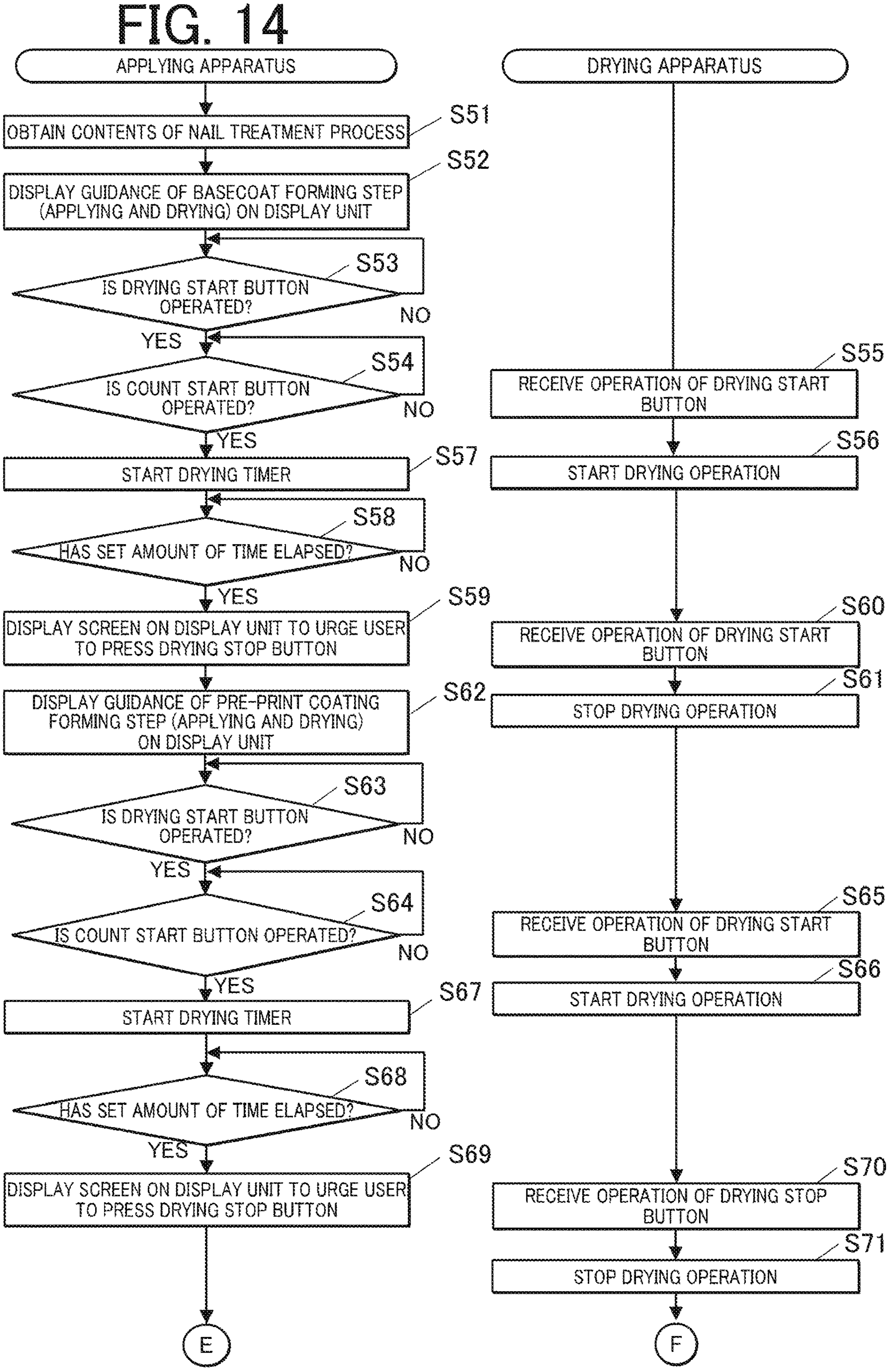
FIG. 14 is a flowchart showing a process between the applying apparatus and the drying apparatus according to the second embodiment.
Figure 15:
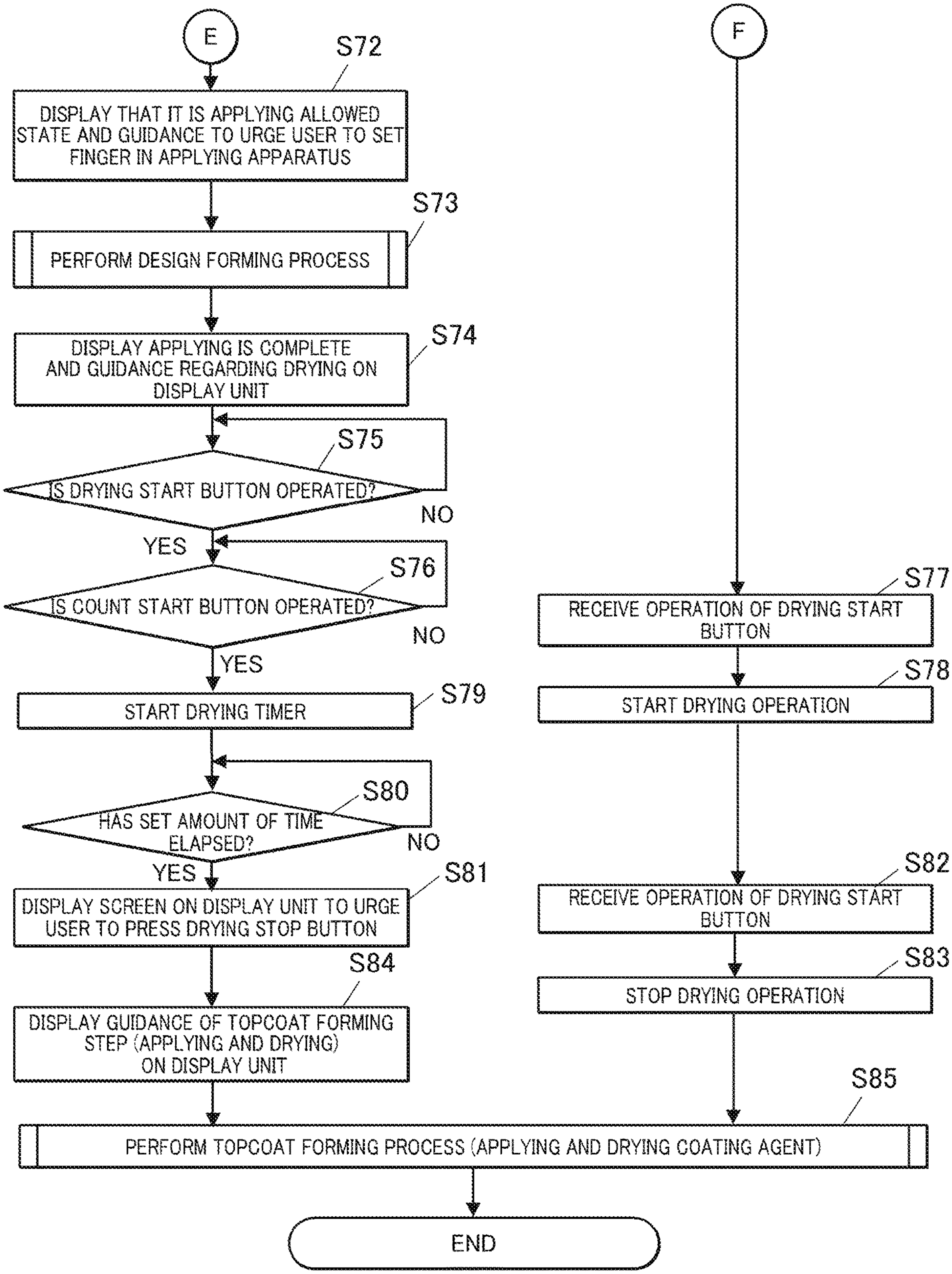
FIG. 15 is a flowchart showing a process between the applying apparatus and the drying apparatus according to the second embodiment.

FIG. 14 and FIG. 15 are flowcharts showing the applying control process of the applying system according to the present embodiment.

As shown in FIG. 14, according to the present embodiment, similar to the first embodiment, first the applying apparatus 1 obtains the contents of the nail treatment process for printing the nail (contents of the forming steps included in the nail treatment process) (step S51). Then, the controller 11 of the applying apparatus 1 displays on the display unit 23 a display screen (display screen 23*s* in FIG. 16) guiding the user to apply the basecoat and to set the finger in the drying apparatus 6 after the applying is finished to dry the basecoat (step S52).

Figure 16A:
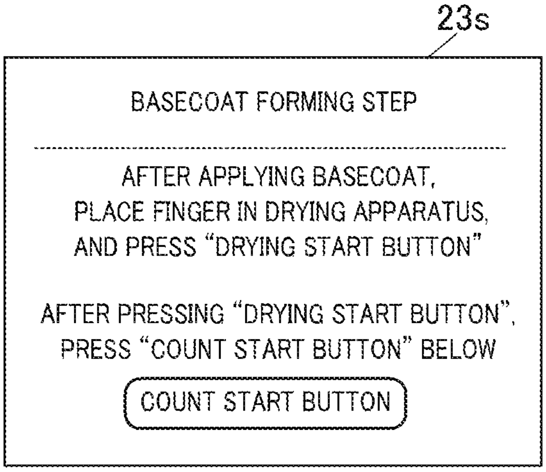
FIG. 16A is an example of the display screen displayed on the display unit in the basecoat forming step according to the second embodiment.

As described above, according to the present embodiment, the drying apparatus 6 and the applying apparatus 1 do not communicate with each other. Therefore, it is not possible for the applying apparatus 1 side to receive the timing that the drying started. Therefore, a message to urge the user to operate the drying start button 81 when the finger is placed in the drying apparatus 6 after applying the basecoat may be displayed on the display screen 23*s* of the display unit 23, and the user may be instructed to operate the apparatus after the drying starts to notify that the drying started. A message to to urge the user to operate a "count start button" to start counting the elapsed time in the applying apparatus 1 side after pressing the drying start button 81 is displayed on the display unit 23. In this case, the controller determines whether there is a notification that the drying start button 81 is operated (step S53) and determines whether the "count start button" is operated to start the count of the elapsed time on the applying apparatus 1 side (step S54). The "count start button" may be a button on a touch panel displayed on the display screen 23*s* as shown in FIG. 16A or may be a button provided on the upper surface of the case 2 similar to the operator 22. Whether the drying start button 81 is operated by the user does not need to be notified to the applying apparatus 1 side, and in this case, the controller 11 determines whether the "count start button" is operated (step S54). When the "count start button" is operated (step S54; YES), it is considered that the drying start button 81 of the drying apparatus 6 is also operated.

When the user operates the drying start button 81 of the drying apparatus 6 according to the display on the display unit 23, the operation signal is received by the operation controller 60 (step S55), and the drying operation by the drying mechanism 73 starts (step S56).

Figure 16B:
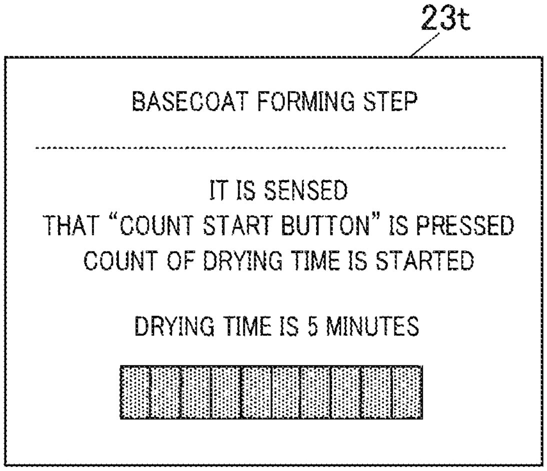
FIG. 16B is an example of the display screen displayed on the display unit in the basecoat forming step according to the second embodiment.

The controller 11 of the applying apparatus 1 determines whether the count start button is operated by the user (step S54). When the count start button is operated by the user (step S54; YES), the controller 11 starts the drying timer (step S57). FIG. 16B is an example of a display screen (display screen 23*t*) displayed on the display unit 23 when it is sensed that the "count start button" is operated.

If the count start button is operated before the start of the drying operation, there is a possibility that it is erroneously determined that the "predetermined set time" elapsed even if the amount of time necessary for drying has not yet elapsed. Therefore, a warning to the user may be displayed on the display screen 23*s* to make sure to keep the order of the operation of the drying start button 81 and the operation of the "count start button".

The controller 11 determines whether the elapsed time counted by the timer elapsed for the "predetermined set time" (step S58). When the amount of time counted by the timer elapsed for the "predetermined set time" (step S58; YES), the screen urging the user to operate the drying stop button 82 is displayed on the display unit 23 (step S59).

When the user operates the drying stop button 82 of the drying apparatus 6 according to the display on the display unit 23, the operation signal is received by the operation controller 60 (step S60), and the drying operation by the drying mechanism 73 stops (step S61).

According to the present embodiment, the processes in step S52 to step S61 shown in FIG. 14 are the processes of the "basecoat forming step". When the "basecoat forming step" ends, the "pre-print coating forming step" is performed. Step S62 to step S71 in FIG. 14 show the process of the "pre-print coating forming step". The specific contents are almost the same as step S52 to step S61 in the "basecoat forming step".

When the processes up to step S71 shown in FIG. 14 are finished, the "basecoat forming step" (that is, applying and drying the basecoat agent) and the "pre-print coating forming step" (that is, applying and drying of the pre-print coating agent) are completed. The processes described above are steps in which the liquid is applied by hand before applying the liquid using the applying apparatus 1 (by the apparatus).

According to the present embodiment, similar to the first embodiment, the controller 11 as the process manager does not allow the applying of the liquid to the target (nail according to the present embodiment) by the applying apparatus 1 until the elapsed time counted for the steps before applying by the applying apparatus 1 exceeds the "predetermined set time" (that is, time necessary to dry the liquid (coating agent). The controller 11 does not allow the applying apparatus 1 to progress to the design forming step until the drying time of the "pre-print coating forming step" exceeds the "predetermined set time".

Therefore, when the drying operation of the "pre-print coating forming step" stops (step S71 in FIG. 14), as shown in FIG. 15, the controller 11 of the applying apparatus 1 displays on the display unit 23 that the applying apparatus 1 is an applying acceptable state and a guidance to urge the user to set the finger in the applying apparatus 1 (step S72).

Figure 16C:
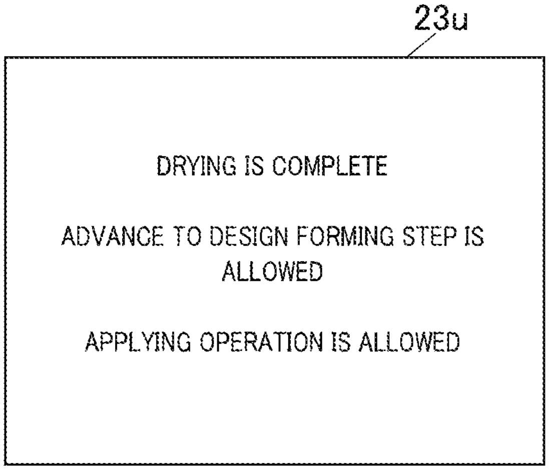
FIG. 16C is an example of the display screen displayed on the display unit in the basecoat forming step according to the second embodiment.

FIG. 16C shows an example of the display screen 23*u* of the display unit 23 notifying to the user that the user is allowed to advance to a design forming step in the above case.

In a situation in which the applying of the liquid to the target (nail) by the applier (applying mechanism 4) of the applying apparatus 1 is allowed, the display screen 23*u* functions as a notifier that notifies the above. Then, the design forming process (liquid (ink) applying step among the forming steps) is performed in the applying apparatus 1 (step S73). When the applying of the ink ends, next, the process progresses to the drying step. Step S74 to step S81 in FIG. are similar to step S52 to step S59 in the "basecoat forming step" and step S60 to step S69 in the "pre-print coating forming step" and the description is omitted.

When the design forming step ends, the applying and drying processes of the topcoat (topcoat forming step) are performed (steps S84 and S85).

Similar to the first embodiment, in a situation in which the user desires to print the design on other nails, the process returns to step S51 or step S52 shown in FIG. 14 and the process is repeated.

The other points are similar to the first embodiment, and the description is omitted.

As described in the present embodiment, the drying apparatus 6 may not be connected to communicate with external apparatuses such as the applying apparatus 1, etc. and may not be able to communicate instruction signals, etc. In such situations, the display unit 23 of the applying apparatus 1 may display an instruction or a guidance message and present this to the user. According to the above, in a situation in which the drying apparatus 6 without the timer function performs the nail print process, the timer on the apparatus 1 side and the data showing the amount of time necessary for drying in each step may be utilized. With this, it is possible to dry the liquid (coating agent) for a suitable amount of drying time.

As described above, the following effects can be achieved according to the above embodiments.

That is, the present embodiment shows an example when the applying process (nail treatment process) of the liquid (first applying material and second applying material) is completed through a plurality of forming steps. The controller 11 that is provided performs the following functions. The controller 11 as the obtainer obtains information showing that the finger corresponding to the nail that is the target is placed in the drying apparatus 6. The controller 11 as the start instruction presenter presents start instruction information to urge the user to start the drying operation by the drying apparatus 6 when information showing that the finger is placed in the drying apparatus 6 is obtained. The controller 11 as the time manager counts the amount of elapsed time from a predetermined point after the information is obtained. The controller 11 as the process manager guides the user to advance to the next forming step when the elapsed time exceeds the predetermined set time. Further, regarding the forming step before applying liquid using the applying mechanism 4 of the applying apparatus 1, the controller 11 as the process manager allows the applying mechanism 4 to apply liquid to the nail when the counted elapsed amount of time exceeds the "predetermined set time".

As described above, the drying apparatus 6 may not be connected to communicate with external apparatuses such as the applying apparatus 1, etc. and may not be able to communicate instruction signals, etc. In such situations, the display unit 23 of the applying apparatus 1 may display an instruction or a guidance message and present this to the user. According to the above, the timer function on the apparatus 1 side and the data included in the applying apparatus 1 showing the amount of time necessary for drying in each step may be utilized. With this, it is possible to dry the liquid (coating agent) for a suitable amount of drying time.

By performing drying for an amount of time suitable for the liquid (coating agent that is the first applying material and the ink that is the second applying material) applied in each forming step, and not guiding the user to the next forming step until the "predetermined set time" necessary for drying elapses, it is possible to prevent the user running ahead and advancing to the next forming step in a state in which the drying is insufficient. With this, the design can be printed on the nail with high quality.

Since the time management of the forming steps can be performed using the drying apparatus 6 that cannot communicate with the applying apparatus 1, etc., even the user that does not have the drying apparatus (nail dryer) dedicated to drying liquid applied to nails can use other dryers with a more simple configuration as a substitute for the nail dryer. In such case, by simply following the guidance displayed on the applying apparatus 1, and operating the applying apparatus 1, the liquid on the nail can be dried for a suitable amount of time and the drying operation in each forming step can be performed appropriately.

Various embodiments of the present invention are described above but the present invention is not limited to the above embodiments, and various modifications are possible without leaving the scope of the present disclosure.

For example, according to the present embodiment, as shown in FIG. 1 to FIG. 3, the controller 11 of the applying apparatus 1 performs various processes and communicates with the drying apparatus 6 when communication is possible. However, the controller that communicates with the drying apparatus 6 is not limited to the controller 11 of the applying apparatus 1.

Figure 17:
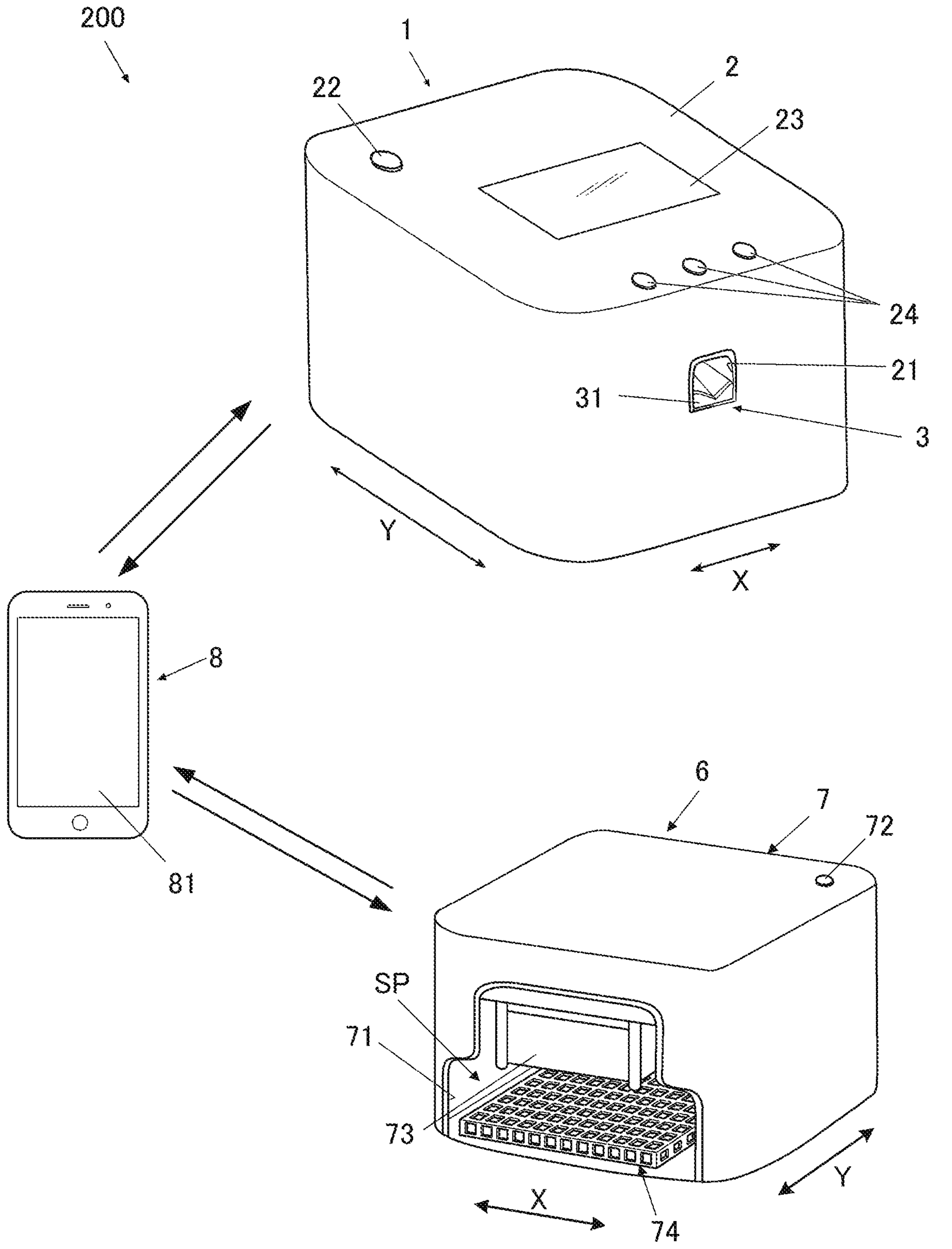
FIG. 17 is a diagram schematically showing a configuration of the applying system according to a modification of the above embodiments.

For example, as shown in FIG. 17, the applying system 200 may include a terminal apparatus 8 linked with the applying apparatus 1 and the drying apparatus 6.

The terminal apparatus 8 in such situation may be portable terminals such as a smartphone owned by the user, a tablet-type terminal apparatus (hereinafter referred to as tablet PC (personal computer)), a cellular phone, or the like, for example. The terminal apparatus 8 is not limited to such portable terminal apparatuses, and may be a laptop PC, a desktop PC, or the like provided in a store in which the applying apparatus 1 is provided. The terminal apparatus 8 is not limited to an apparatus separate from the applying apparatus 1 and may be an operation terminal handled as one with the applying apparatus 1.

According to the present embodiment, the controller 11 of the applying apparatus 1 includes the following functions. That is, the controller 11 functions as the time manager that counts the time that elapsed since the drying operation by the drying apparatus 6 started, the process manager that guides the user to progress to the next step when the elapsed time exceeds the "predetermined set time", the display controller that switches the display on the display screen of the display unit 23 to the guidance to apply the second applying material (liquid such as ink), and the applying controller that allows the start of the applying operation of the second applying material (liquid such as ink) by the applying apparatus 1. However, the functions do not have to be performed by the controller 11. For example, in a situation in which the applying system 200 includes the terminal apparatus 8 as shown in FIG. 17, some or all of the above functions may be performed by the controller (not shown) in the terminal apparatus 8. Alternatively, the above functions can be performed by the operation controller 60 of the drying apparatus 6.

Further, the display screen that displays the guidance display to guide the applying of the second applying material is not limited to the display screen of the display unit 23. Alternatively, for example, the display unit may be provided in the terminal apparatus 8 (display unit 81 shown in FIG. 17) and the guidance can be displayed on this display screen.

Alternatively, the guidance display to guide the user to apply the second applying material may be performed on the display screen of the display unit 81 of the terminal apparatus 8 as shown in FIG. 17.

According to the present embodiment, the controller 11 of the applying apparatus 1 includes a timer function, the drying apparatus 6 includes a finger sensor 75, and when the controller 11 of the applying apparatus 1 receives the information showing that the finger is sensed by the finger sensor 75, the controller 11 instructs the start of the drying operation to the drying apparatus 6 or starts the count of the elapsed time of the drying operation. However, the device including the timer function is not limited to the controller of the applying apparatus 1. The operation controller 60 of the drying apparatus 6 may include the timer function, and when the finger sensor 75 detects the finger, the drying operation may be started by the drying apparatus 6 side and the elapsed time may be counted from the point of the start of the drying operation. Then, in this case, when the elapsed time exceeds the "predetermined set time", the drying operation of the drying mechanism 73 may be stopped, and a notification showing that the elapsed time exceeded the "predetermined set time" may be sent to the applying apparatus 1. When the applying apparatus 1 received the notification that the drying time exceeded the "predetermined set time", the controller 11 of the applying apparatus 1 displays on the display unit 23 that the applying operation by the applying apparatus 1 is allowed, and advances the applying mechanism 4 of the applying apparatus 1 to an applying operation allowed state.

Further, the sensor is not limited to the finger sensor 75 of the drying apparatus 6. The controller 11 on the applying apparatus 1 side may consider that the finger set in the drying apparatus 6 is sensed upon receiving a notification showing that the finger is sensed by the finger sensor 75 transmitted by communication to the applying apparatus 1 side. In this case, the controller 11 that received the notification that the finger is sensed is considered to be the sensor.

For example, in a situation in which the drying apparatus does not include a communication function as described in the second embodiment, it may be possible to acknowledge that the finger is placed in the drying apparatus by using a camera function of the terminal apparatus linked with the applying apparatus 1.

In this case, the user is to operate the button only regarding the switching of on and off of the drying apparatus side, and the timing to start the count of the elapsed time in the applying apparatus side can be performed based on the result of recognizing the finger by the terminal apparatus.

Even in a situation in which the drying apparatus is able to communicate with the applying apparatus, it may be possible to acknowledge that the finger is placed in the drying apparatus by using the camera function of the terminal apparatus linked with the applying apparatus 1.

In this case, there is no need to provide a sensor such as a finger sensor in the drying apparatus. In a situation in which the terminal apparatus is an operation terminal that performs control of the applying apparatus, when it is acknowledged that the finger is placed in the drying apparatus from the image obtained by the camera, even if this is not notified to the applying apparatus side, the process of counting the elapsed time may be performed in the terminal apparatus side.

The configuration of the applying mechanism 4 of the applying apparatus 1 is not limited to the apparatus including only the head 41 for applying the design as in the above embodiment.

In addition to the head 41 for applying the design, the applying mechanism may include a head for applying the basecoat formed as a base with a white color (white color or pink or blue close to white), etc. on the nail before applying the design, a head for applying a pre-print coating for forming an ink receptive layer, and a head for applying a topcoat to form a protective layer. With this, the basecoat, the pre-print coating and the topcoat may also be applied by the applying mechanism 4 of the applying apparatus 1. By performing the basecoat forming step, the pre-print coating forming step, and the topcoat forming step in the applying apparatus 1, there is no need to perform the applying steps by hand. With this, the design can be printed on the nail with an even and beautiful finish.

In such situation, the applying steps performed by the applying apparatus 1 are the same processes as the design forming steps described in the above embodiment.

Although some embodiments of the present invention have been described above, the scope of the present disclosure is not limited to the embodiments described above, but includes the scope of the invention described in the claims and their equivalents.

The invention claimed is:

1. An applying system comprising:

a drying apparatus that dries a first applying material applied to a surface of a nail;

an applying apparatus that applies a second applying material on the surface of the nail with the first applying material dried by the drying apparatus in between;

a display; and at least one hardware processor configured to:

sense that the nail is placed in the drying apparatus;

count, from a timing at which it is sensed that the nail is placed in the drying apparatus, an elapsed time of a drying operation started in the drying apparatus, and in response to the elapsed time exceeding a predetermined set time, switch a guidance display displayed on the display to a guidance display which guides a user to apply the second applying material, wherein:

the drying apparatus and the applying apparatus are provided as separate devices which are communicably connected to each other, the drying apparatus transmits a first sensing signal to the applying apparatus in response to sensing that the nail is placed in the drying apparatus, and in response to receiving the first sensing signal, the applying apparatus (i) transmits a drying start instruction to the drying apparatus instructing start of the drying operation and (ii) starts a timer for counting the elapsed time.

2. The applying system according to claim 1, wherein the at least one hardware processor is configured to wait until a timing or a planned timing at which the first applying material applied on the surface of the nail completes drying before switching the guidance display displayed on the display to the guidance display which guides the user to apply the second applying material.

3. The applying system according to claim 2, wherein the timing or the planned timing differs depending on a type of the first applying material.

4. The applying system according to claim 2, wherein the display and the at least one hardware processor are provided in the applying apparatus.

5. The applying system according to claim 2, wherein the display and the at least one hardware processor are provided in an external apparatus that is provided separately from and is communicatively connected to the applying apparatus and the drying apparatus.

6. The applying system according to claim 1, wherein the at least one processor is configured to wait until a timing or a planned timing at which the first applying material applied on the surface of the nail completes drying before allowing start of an applying operation of the second applying material by the applying apparatus.

7. The applying system according to claim 6, wherein the timing or the planned timing differs depending on a type of the first applying material.

8. The applying system according to claim 6, wherein the at least one hardware processor is provided in the applying apparatus.

9. The applying system according to claim 1, wherein the predetermined set time differs depending on a type of the first applying material.

10. The applying system according to claim 1, wherein the at least one hardware processor is further configured to, in response to the elapsed time exceeding the predetermined set time, allow start of the applying operation of the second applying material by the applying apparatus.

11. The applying system according to claim 10, wherein the predetermined set time differs depending on a type of the first applying material.

12. The applying system according to claim 10, wherein the at least one hardware processor notifies that the start of the applying operation of the second applying material is allowed on the display.

13. The applying system according to claim 1, wherein the at least one hardware processor is further configured to set a predetermined delay time before a timer for counting the elapsed time of the drying operation is started.

14. An applying support method that is performed by an applying system including an applying apparatus, a drying apparatus, and a display, the method comprising:

sensing that a nail is placed in the drying apparatus;

drying, with the drying apparatus, a first applying material applied on a surface of the nail by the applying apparatus;

counting, from a timing at which it is sensed in the sensing that the nail is placed in the drying apparatus, an elapsed time of a drying operation started in the drying apparatus;

in response to the elapsed time exceeding a predetermined set time, switching a guidance display displayed on the display to a guidance display which guides a user to apply the second applying material; and applying, with the applying apparatus, a second applying material on the surface of the nail with the first applying material dried by the drying apparatus in between, wherein:

the drying apparatus and the applying apparatus are provided as separate devices which are communicably connected to each other, the drying apparatus transmits a first sensing signal to the applying apparatus in response to sensing that the nail is placed in the drying apparatus, and in response to receiving the first sensing signal, the applying apparatus (i) transmits a drying start instruction to the drying apparatus instructing start of the drying operation and (ii) starts a timer for counting the elapsed time.

15. The applying support method according to claim 14, further comprising waiting until a timing or a planned timing at which the first applying material applied on the surface of the nail completes drying before switching the guidance display displayed on the display to the guidance display which guides the user to apply the second applying material.

16. The applying support method according to claim 14, wherein the applying includes waiting until a timing or a planned timing at which the first applying material applied on the surface of the nail completes drying before allowing start of an applying operation of the second applying material by the applying apparatus.

17. The applying support method according to claim 14, wherein the applying includes, in response to the elapsed time exceeding the predetermined set time, allowing start of the applying operation of the second applying material by the applying apparatus.

18. A non-transitory computer-readable storage medium having a program stored thereon for controlling a computer in an applying system provided with a drying apparatus, an applying apparatus, and a display, the program controlling the computer to perform processes comprising:

sensing that a nail is placed in the drying apparatus;

counting, from a timing at which it is sensed in the sensing that the nail is placed in the drying apparatus, an elapsed time of a drying operation started in the drying apparatus with respect to a first applying material applied on a surface of the nail; and in response to the elapsed time exceeding a predetermined set time, switching a guidance display displayed on the display to a guidance display which guides a user to apply a second applying material on the surface of the nail by the applying apparatus, wherein:

the drying apparatus and the applying apparatus are provided as separate devices which are communicably connected to each other, the drying apparatus transmits a first sensing signal to the applying apparatus in response to sensing that the nail is placed in the drying apparatus, and in response to receiving the first sensing signal, the applying apparatus (i) transmits a drying start instruction to the drying apparatus instructing start of the drying operation and (ii) starts a timer for counting the elapsed time.

19. The storage medium according to claim 18, wherein the timing or the planned timing differs depending on a type of the first applying material.

* * * * *